US008145394B2

(12) United States Patent
Chiorean et al.

(10) Patent No.: US 8,145,394 B2
(45) Date of Patent: Mar. 27, 2012

(54) AUTOMATIC METHOD AND SYSTEM FOR THE CALIBRATION OF EARTHWORKING MACHINES

(76) Inventors: Dumitru-Mircea Chiorean, Le Mesnil le Roi (FR); Alessandro Bertola, Taino (IT); Gianmarco Bonetti, Via Puccini Castelletto Ticino (IT); Rodica-Mariana Chiorean, Le Mesnil le Roi (FR); Vlad Chiorean, Le Mesnil le Roi (FR)

( * ) Notice: Subject to any disclaimer, the term of this patent is extended or adjusted under 35 U.S.C. 154(b) by 496 days.

(21) Appl. No.: 12/401,196

(22) Filed: Mar. 10, 2009

(65) Prior Publication Data
US 2009/0228169 A1 Sep. 10, 2009

(30) Foreign Application Priority Data
Mar. 10, 2008 (FR) ...................................... 08 01301

(51) Int. Cl.
*G06F 19/00* (2006.01)
*G01M 17/00* (2006.01)
*G01D 18/00* (2006.01)
*G01R 35/02* (2006.01)

(52) U.S. Cl. ............. 701/50; 701/31; 702/85; 702/105; 74/471 R

(58) Field of Classification Search ............ 701/31, 701/50; 455/41.2; 702/33, 85, 86, 105; 37/348; 414/699; 318/568.18; 74/471 XY
See application file for complete search history.

(56) References Cited

U.S. PATENT DOCUMENTS

| | | | |
|---|---|---|---|
| 3,549,876 A * | 12/1970 | Hamilton | 702/158 |
| 5,572,809 A * | 11/1996 | Steenwyk et al. | 37/348 |
| 5,682,311 A * | 10/1997 | Clark | 701/50 |
| 6,140,787 A | 10/2000 | Lokhorst et al. | |
| 6,209,232 B1 * | 4/2001 | Ono et al. | 37/348 |
| 6,281,651 B1 * | 8/2001 | Haanpaa et al. | 318/568.11 |
| 6,615,114 B1 * | 9/2003 | Skiba et al. | 700/275 |
| 7,359,816 B2 * | 4/2008 | Kumar et al. | 702/87 |
| 7,627,410 B2 * | 12/2009 | Berry et al. | 701/50 |
| 2002/0072840 A1 * | 6/2002 | Kalafut et al. | 701/50 |
| 2007/0135985 A1 * | 6/2007 | Berry et al. | 701/50 |
| 2007/0168100 A1 * | 7/2007 | Danko | 701/50 |
| 2007/0260380 A1 * | 11/2007 | Mintah et al. | 701/50 |
| 2008/0005938 A1 * | 1/2008 | Aebischer et al. | 37/413 |
| 2009/0228169 A1 * | 9/2009 | Chiorean et al. | 701/31 |
| 2009/0228176 A1 * | 9/2009 | Mintah et al. | 701/50 |
| 2009/0259373 A1 * | 10/2009 | Nichols et al. | 701/50 |
| 2009/0267557 A1 * | 10/2009 | Keefover et al. | 318/565 |
| 2010/0017074 A1 * | 1/2010 | Verkuilen et al. | 701/50 |
| 2010/0023229 A1 * | 1/2010 | Chiocco | 701/50 |
| 2010/0121540 A1 * | 5/2010 | Kumagai et al. | 701/50 |
| 2010/0153047 A1 * | 6/2010 | Youssefi et al. | 702/85 |
| 2010/0161184 A1 * | 6/2010 | Marathe et al. | 701/50 |

* cited by examiner

Primary Examiner — Eric Culbreth
Assistant Examiner — Karen A Beck
(74) Attorney, Agent, or Firm — Lowe Hauptman Ham & Berner, LLP

(57) ABSTRACT

An earthworking machine having a working tool at the end of an articulated arm is automatically calibrated. The calibration method includes collecting angular position data relating to different articulated components, after a series of movements of the end of the working tool between reference points located in accordance with a given geometrical configuration. These data are derived by imprecisely positioned detectors on each articulated component and then sent to a machine calibration system that executes a calculation module of the calibration system to determine, by use of known input data, unknown parameters which, once determined, control a luminous indicator display which guides the machine operator in the horizontal and/or vertical movements for the depth of the tool.

31 Claims, 7 Drawing Sheets

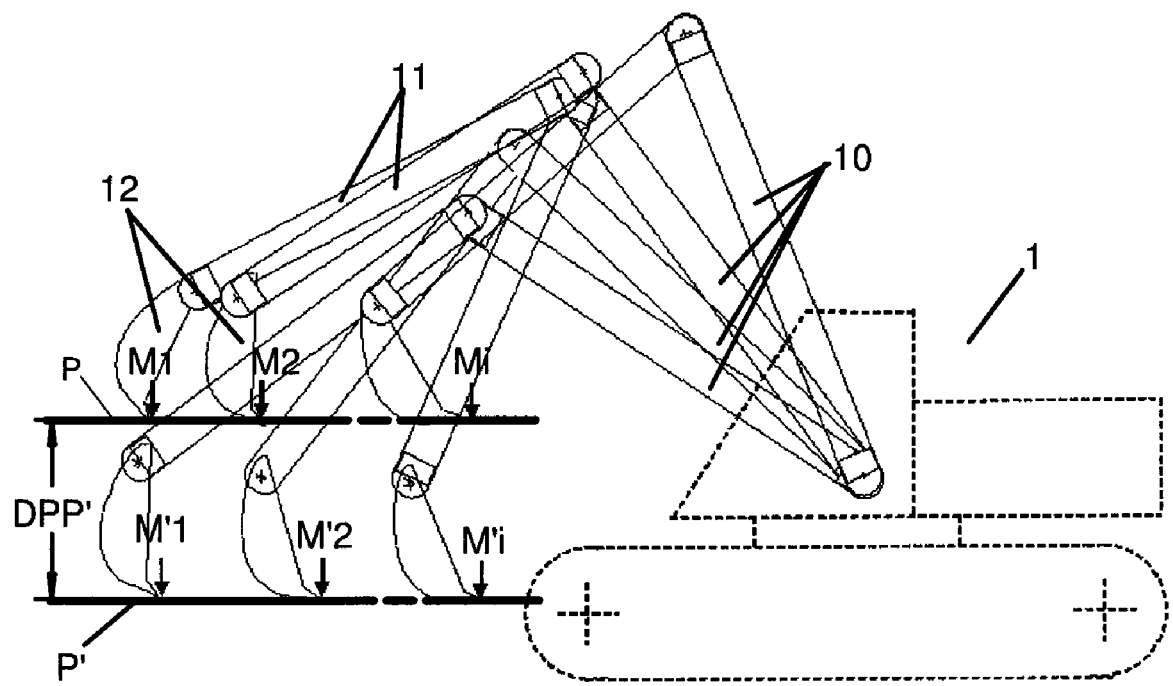
Fig. 4
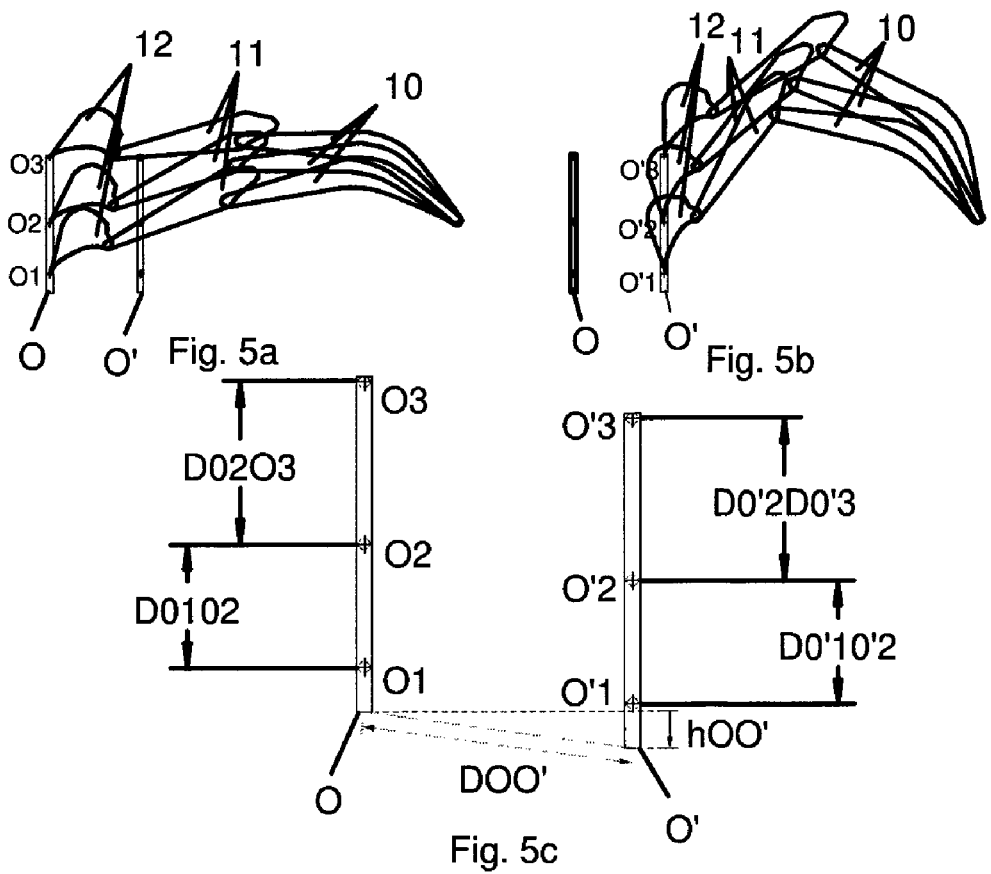
Fig. 5a   Fig. 5b
Fig. 5c

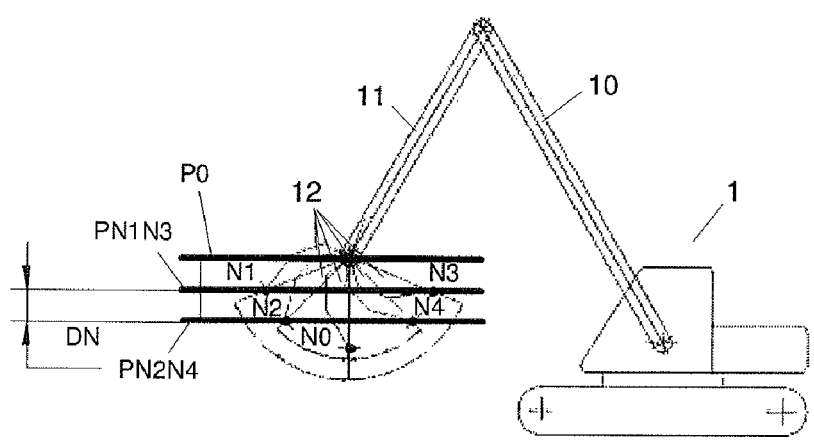
Fig. 7a
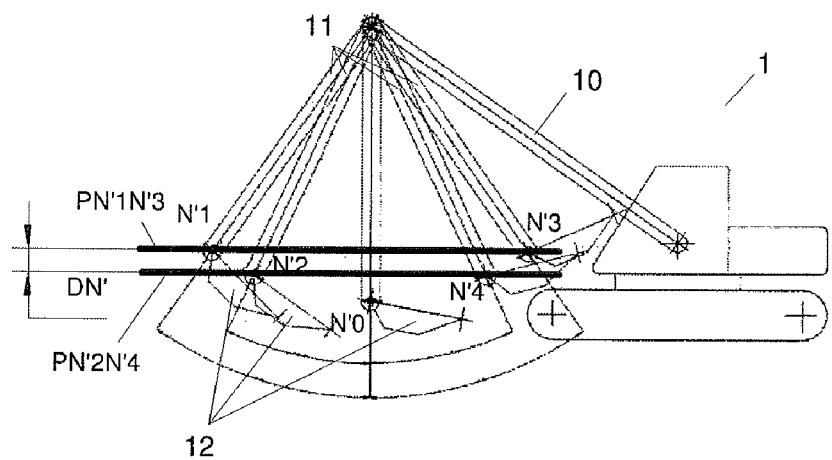
Fig. 7b
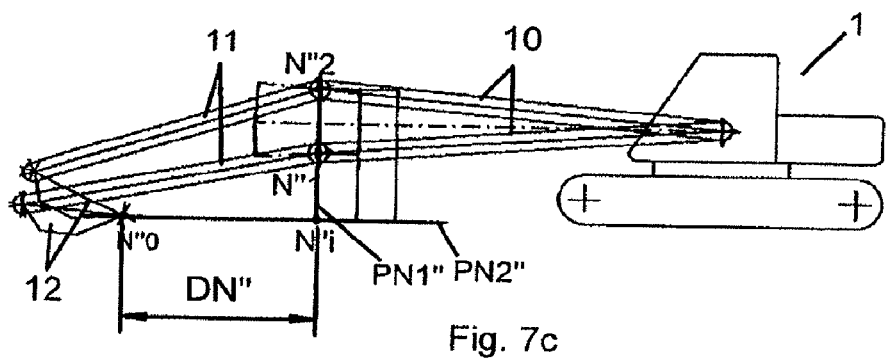
Fig. 7c
Fig. 7

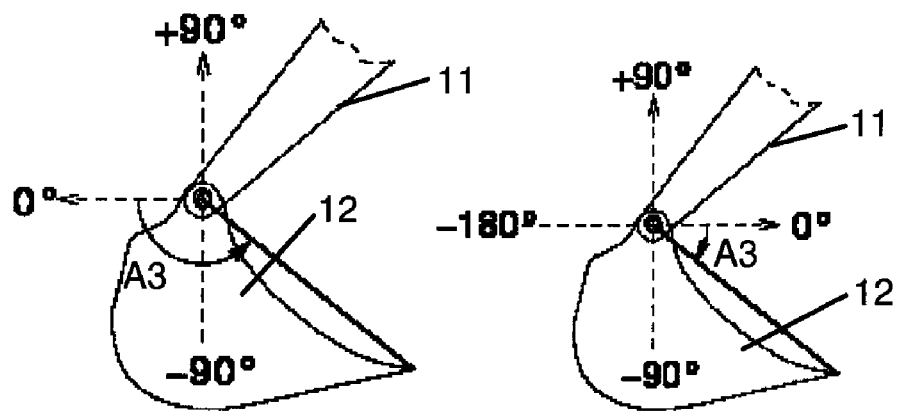
Fig. 8a          Fig. 8b
Fig. 8
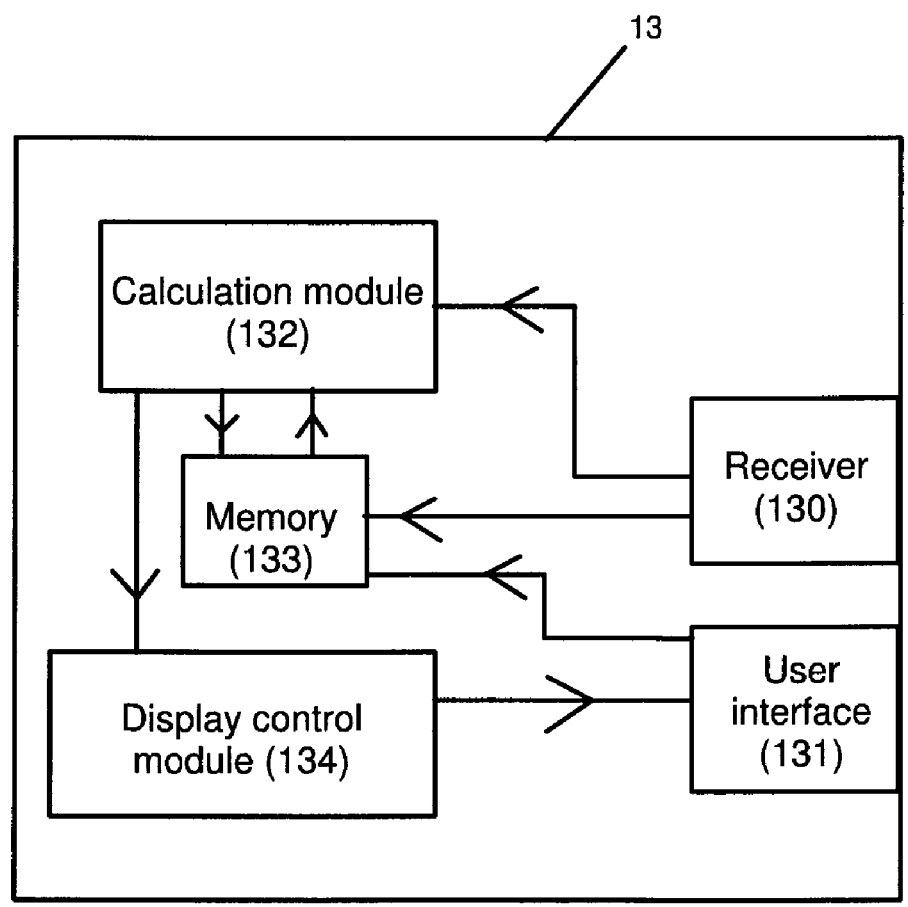
Fig. 9

AUTOMATIC METHOD AND SYSTEM FOR THE CALIBRATION OF EARTHWORKING MACHINES

RELATED APPLICATION

The present application is based on, and claims priority from, FR Application Number 0801301, filed Mar. 10, 2008, the disclosure of which is hereby incorporated by reference herein in its entirety.

FIELD OF INVENTION

This present invention concerns the area of the calibration or standardisation of earthworking machines equipped with an articulated arm at the end of which is placed an excavation tool or similar. The invention more particularly concerns a method and a system for automatically calibrating earthworking machines, such as that of mechanical shovels, excavators, etc. The invention also concerns an earthworking machine equipped with an automatic calibration system, and use of the calibration method.

BACKGROUND ART

In earthworking machines, it is common to have machines, such as those represented in U.S. Pat. No. 6,140,787, that are fitted with an articulated arm on a self-propelled assembly, with the articulated arm being controlled by hydraulic jacks and following a modifiable trajectory, at the end of which is positioned an excavation tool or a similar tool such as a bucket, itself controlled in an angular position by a hydraulic jack. Angle sensors positioned with precision on the articulations of the machine arms, as is the case in document U.S. Pat. No. 6,140,787, or fixed onto the arm, are used to determine the angles between the machine and the first articulated element forming the arm, between the first and the second articulated elements forming the arm, and between the second articulated element forming the arm and the tool. Knowing these angular values and the exact dimensions of the elements forming the articulated arm of the machine between the different articulation points of the arm, it is perfectly possible to control the movements of the machine by means of control levers that are used to determine the movements of the hydraulic jacks and, as a consequence, to determine the position of the bucket. In such devices however, it is necessary to perform a calibration of the control circuits of the machine in order to be sure of the final position of the bucket, even when one precisely knows the angles and lengths of the articulation elements forming the arm.

SUMMARY OF THE INVENTION

The present invention is totally different, in the sense that the position angle sensors on the articulation elements forming the arm of the machine is not imposed in a precise manner, and will be determined later. These angle sensors are attached by means of magnets onto the articulation elements forming the arm of the machine, and transmit a signal that is assumed to represent the angle formed by the vertical and the axis of the articulation element on which the angle sensor is placed.

However, positioning of the angle sensors on the articulation elements forming the arm of the machine is effected by the operator in an imprecise manner. As a consequence, there exists an angular offset between the axis determining the position of the angle sensor and the axis determining each articulation element.

Moreover, on certain existing systems, it is possible to place the angle sensors with an angular offset and then to determine the latter. However determining the angular offset is a fastidious exercise, since it is necessary to hold the articulated arm or the working tool in a position at which the angle is perfectly known. It is then necessary to manually enter the known value into the control unit of the system that will determine the angular offset with the value measured by the angle sensor.

The purpose of this present invention is to correct one or more of the drawbacks of the prior art, and proposes a method for automatically calibrating an earthworking or public works machine that is equipped with an articulated arm at the end of which is placed an excavation tool or similar, which it uses, firstly, to eliminate the fastidious adjustments obliging the operators to move and secondly, to accurately measure the lengths of the different articulated components (arm and working tool) of the earthworking machine.

In order to attain this objective, the method for automatically calibrating an earthworking machine equipped with an articulated arm in a plane and unable to rotate about its axis of symmetry, at the end of which is positioned a working tool, is characterised in that, after a series of movements of the end of the working tool between reference points that do not belong to the earthworking machine placed in accordance with a given geometrical configuration, the calibration method consists of collecting angular position data relating to the different articulated components of the earthworking machine, with these angular position data being delivered by removable and interchangeable detection devices positioned in an imprecise manner on each articulated component of the machine, and then sent by a wireless link to a system for calibrating the earthworking machine, in order to execute a calculation module of the machine calibration system, so as to determine unknown parameters representing the positioning inaccuracies of the detectors, by means of known input data representing the reference points.

This present invention advantageously allows the driver of a public works machine to prepare his machine for work without requiring the intervention of a specialist technician.

According to another particular feature, the unknown parameters correspond to the lengths of the articulated components of the machine and the angular offsets of each detector device in relation to the articulated component on which the detector device is positioned.

According to another particular feature, the stage for calculation and determination of the unknown parameters consists of solving a system of mathematical equations by means of an appropriate program for the solution of mathematical equations, executed by the calculation module of the machine calibration system.

According to another particular feature, the mathematical equations are obtained from mathematical relations that determine the data representing the vertical position and the horizontal position of the working tool as a function of the unknown parameters.

According to another particular feature, the known input data for a given geometrical configuration correspond to the distances between the reference planes and/or lines on which the reference points of the said geometrical configuration are positioned, and/or to the distances between the reference points of the said geometrical configuration and/or, where appropriate, to the coordinates of the reference points of the said geometrical configuration, where these known input data are entered by an operator and then stored in the memory of the calibration system to correspond to a position of the end of the tool, with a view to their use for calculating the unknown parameters by associating them with the measured angular position data corresponding to each position taken up by the end of the working tool.

According to another particular feature, the geometrical configurations correspond to geometrical combinations of reference planes or lines, which can be vertical or horizontal or oriented at a known angle, on which are positioned at least one reference point, with the reference planes or lines of the geometrical configurations being obtained by means of a laser device or by the movement of a rod on which are positioned markers corresponding to the reference points or again by any type of device that can be used to form a reference plane or line.

According to another particular feature, the solution of the system of mathematical equations is effected by a program that is executed by the calculation module of the calibration system, solving a matrix system which, for the given geometrical configuration and for each position of the said geometrical configuration taken up by the end of the working tool, contains the angular position data of each articulated component of the machine and the known input data relating to this geometrical configuration, or using one or more appropriate mathematical methods.

According to another particular feature, the number of equations determined by each position taken by the end of the working tool for the given configuration, and forming the matrix system, is equal to or greater than the number of unknown parameters to be determined.

According to another particular feature, the calibration method can include a stage for determining and eliminating the erroneous angular position data that are created by a program which is executed by the calculation module of the calibration system, using one or more appropriate mathematical methods, with the known input data associated with the erroneous angular position data being eliminated from the data set necessary for calculating the unknown parameters.

According to another particular feature, a stage for analysis of the measurement errors is provided where appropriate to estimate the quality of the calibration method and consists of performing a test on a quantity while taking account of the measured input and angular position data and the result of the calibration.

According to another particular feature, in the event of a change by the operator of at least one articulated component of the machine, or a change or movement by the operator of at least one detector device, the calibration method is not necessarily re-executed in full, and the unchanged parameters, represented on a display system of the calibration system, are specified by the operator as constants in place of the unknown parameters.

According to another particular feature, once determined, and, where appropriate, after elimination of the erroneous data, the parameters are, where appropriate, validated by the operator by means of a test, and are then stored in the memory of the machine calibration system so that they can be used for controlling the luminous indicator display used to guide the operator for movement of the working tool after the calibration.

According to another particular feature, the test consists of positioning the working tool on a reference plane or line and then verifying that the horizontal and/or vertical depths of the working tool have not changed.

According to another particular feature, in the case in which the detector device is placed on one of the elements forming the articulation compass between the working tool and the arm of the working tool, a stage prior to the calibration method is effected where appropriate, and consists of moving one of the detector devices on the working tool, and then rotating the working tool about its articulation axis over different reference points, with the detector device placed on one of the elements of the compass, and the moved detector device supplying the calibration system, for each movement of the working tool, with the measured angular position data, and then with the calculation module of the calibration system, by means of an appropriate program, effecting a comparison between the angular position data supplied by these detector devices so as to obtain a mathematical relation that can be used to determine the angular offset of the detector device placed on one of the elements forming the articulation compass.

Another objective is met by proposing a system for automatically calibrating an earthworking machine equipped with an articulated arm at the end of which is positioned a working tool, where an independent detector device equipped with angular position sensor(s) is positioned in an imprecise, removable and interchangeable manner on each articulated component, and where the calibration system is used to implement the automatic calibration method according to the invention, characterised in that the calibration system includes a unit, on the front panel of which is provided a user interface fitted with a display screen, together with a keyboard and a button to trigger the measurement, and then to send and store the angular position data supplied by the detector devices, where the unit contains inside:
- a wireless communication receiver intended to receive the signals representing the angular position data transmitted by the different detector devices;
- a memory intended to store the data measured by the detector devices, the known input data entered by the operator on the keyboard of the user interface, and the calibration parameters, once they have been determined;
- a calculation module which, by the use of an appropriate program for the solution of mathematical equations, is intended to calculate and determine the unknown parameters, by means of the known input data stored in the memory and the measured and received angular position data.

According to another particular feature, after the calibration, the calculation module is designed to supply information calculated by means of the determined calibration parameters and work profiles chosen by the operator, to a control module of the luminous indicator display of a guidance system of the machine, so as to guide the operator when moving the bucket, or any other display means providing assistance to the driver.

According to another particular feature, the program for the solution of mathematical equations executed by the calculation module for the calibration is designed to solve a system of mathematical equations.

According to another particular feature, the calculation module is designed to determine and eliminate erroneous data resulting from measurement errors from all of the entry data supplied and necessary for the mathematical solution process.

According to another particular feature, the screen, which is common to the calibration system and the guidance system of the machine, is used to display different profiles that can be chosen by the operator to control the working tool after the calibration, the chosen profile and the information necessary for calibrating the working tool and the keyboard, common to the calibration system and to the guidance system of the machine, enable the operator to choose the work profile, to enter information relating to the known input data and for validation of the calibration parameters as well as the control setpoints of the working tool.

According to another particular feature, the wireless receiver of the calibration system uses radio waves at a given frequency, or any other short or medium distance wireless communication device.

According to another particular feature, the calibration system can be powered by the power source present in the cab of the excavating machine.

According to another particular feature, in the case in which the detector device is placed on one of the elements forming the articulation compass between the working tool and the arm of the working tool, the calculation module includes a program that is used, prior to the calibration, to determine a mathematical relation so as to determine the angular offset of the detector device placed on one of the elements forming the articulation compass from the comparison of angular position data supplied by the detector device placed on one of the elements of the compass and the moved detector device on the working tool.

Another objective is met by proposing an earthworking machine equipped with an articulated arm at the end of which is positioned a working tool, characterised in that it includes at least one independent detector device equipped with wireless type angular position sensor(s), with the detector device being positioned in an imprecise, removable and interchangeable manner on each articulated component, control levers for manually controlling the machine, and an automatic calibration system according to the invention, placed in the cab of the earthworking machine.

According to another particular feature, a laser detector can be placed at the end of the working tool so as to determine the moment at which the end of the working tool is positioned at a reference point of a reference laser plane or line used for the calibration, and thus to automatically trigger the measurement and then the transmission and storage of the angular position data supplied by the detector devices, in the case in which the reference planes or lines of the determined geometrical configurations used for the calibration are created by laser devices.

According to another particular feature, the detector device is equipped with a communication module to send one or more trigger signals for measurement the angular position data intended for the detector devices.

According to another particular feature, a laser receiver device can be placed in an imprecise manner on one of the articulated arms of the machine to detect a height on a reference laser plane or line, in the case in which reference laser planes or lines are used to control the working tool after the calibration.

According to another particular feature, the laser receiver device includes a communication module that is to send a transmit signal or signals, and thus to transmit laser beam detection data to a guidance system of the machine.

According to another particular feature, the communication module of the laser detector, and the communication module of the linear laser receiver device use radio waves at a given frequency, or any other short or medium distance wireless communication device.

According to another particular feature, the reference plane or line is created by a laser device and detected by a laser receiver device placed on one of the articulated elements of the machine, where this detection may require a stage, in addition to the calibration process, for determining the axial and longitudinal positions.

According to another particular feature, the stage in addition to the calibration process consists of effecting, for different angular configurations adopted by the articulated elements and the working tool, the cross-referencing between the reference plane or line and the end of the working tool, and then the cross-referencing of this same reference plane or line with the laser receiver device to supply, to the calculation module of the machine calibration system, a series of equations linking the position of the laser detector device to the geometry of the system formed by the articulated elements and the working tool, with the calculation module of the calibration system being designed to determine, via an appropriate program for the solution of mathematical equations, the unknown axial and longitudinal position parameters of the laser receiver device on its articulated element.

The invention will be understood more clearly, and the other aims, characteristics, details and advantages of the latter will appear more clearly on reading the explanatory description that follows, with reference to the appended figures provided by way of non-limiting examples.

BRIEF DESCRIPTION OF THE DRAWINGS

FIG. 4 is an illustration of a preferred embodiment of a stage for moving the end of the bucket type working tool of the works machine of the automatic calibration method according to the preferred embodiment of the invention, where this preferred embodiment includes moving the end of the working tool of the works machine to different reference points on two reference planes or horizontal and mutually parallel lines;

FIG. 5 is an illustration of a first variant of the stage for moving the end of the working tool of the works machine of the automatic calibration method according to the preferred embodiment of invention, where this first variant includes moving the end of the working tool of the works machine to different reference points on a first vertical reference line (this movement being illustrated in FIG. 5a), and then to different reference points on another vertical reference line parallel to the first reference line (this movement being represented in FIG. 5b);

FIG. 7 is an illustration of a third variant of the stage for moving the end of the working tool of the works machine of the automatic calibration method according to the preferred embodiment of the invention, where this third variant includes independently and successively moving each articulated component of the works machine;

FIG. 7a is an illustration of the movement of the end of the tool at four points located two by two respectively on two horizontal and mutually parallel reference planes or lines, with the support arm and the bucket arm remaining fixed during the movement;

FIG. 7b is an illustration of the movement of the end of the bucket arm at four reference points located two by two respectively in two mutually horizontal and parallel reference planes or lines, with the support arm remaining fixed during the movement;

FIG. 7c is an illustration of the movement of the articulation of the support arm and of the bucket arm at two reference points, these two reference points being on a reference plane or line that is vertical and perpendicular to another horizontal reference plane or line which includes a reference point on which the end of the tool is positioned and fixed during the movement;

FIG. 8 is an illustration of the orientation of the angles necessary to correctly calculate the vertical position in depth of the bucket type working tool;

FIG. 9 is an illustration of the system for automatically calibrating the works machine according to the preferred embodiment of the invention.

DETAILED DESCRIPTION OF THE DRAWINGS

Figure 1:
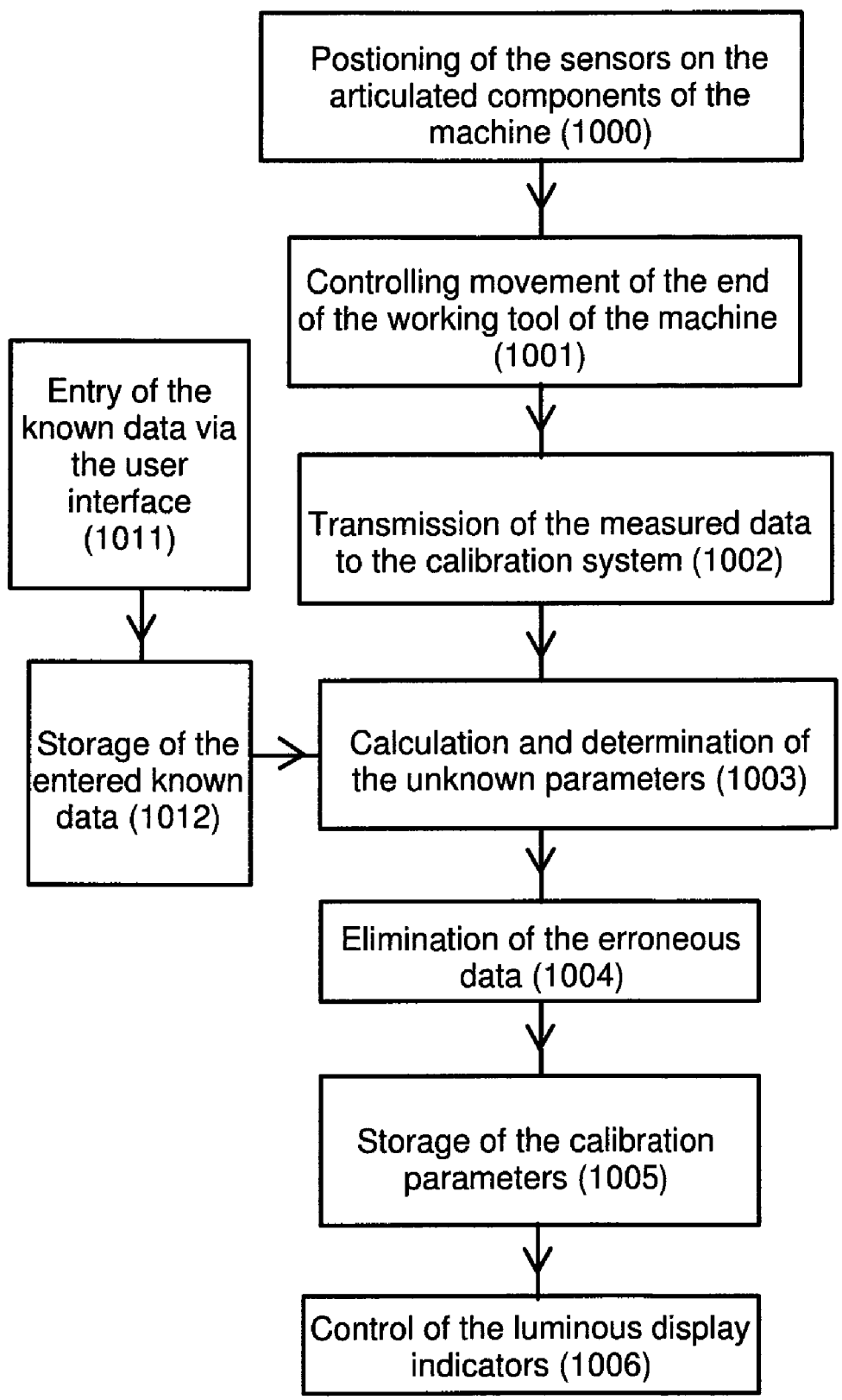
FIG. 1 is an illustration of a method of automatically calibrating a works machine according to a preferred embodiment of the invention.
Figure 2:
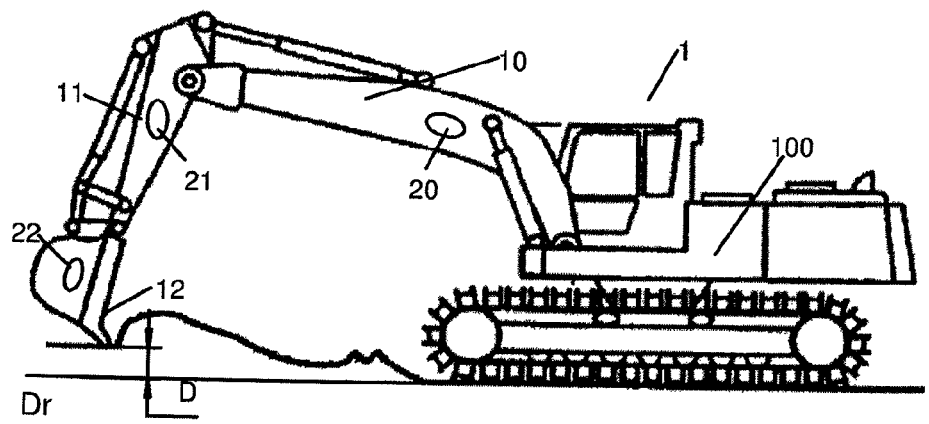
FIG. 2 is an illustration of a works machine equipped with wireless detector devices used to calibrate the works machine according to a preferred embodiment of the invention.
Figure 3:
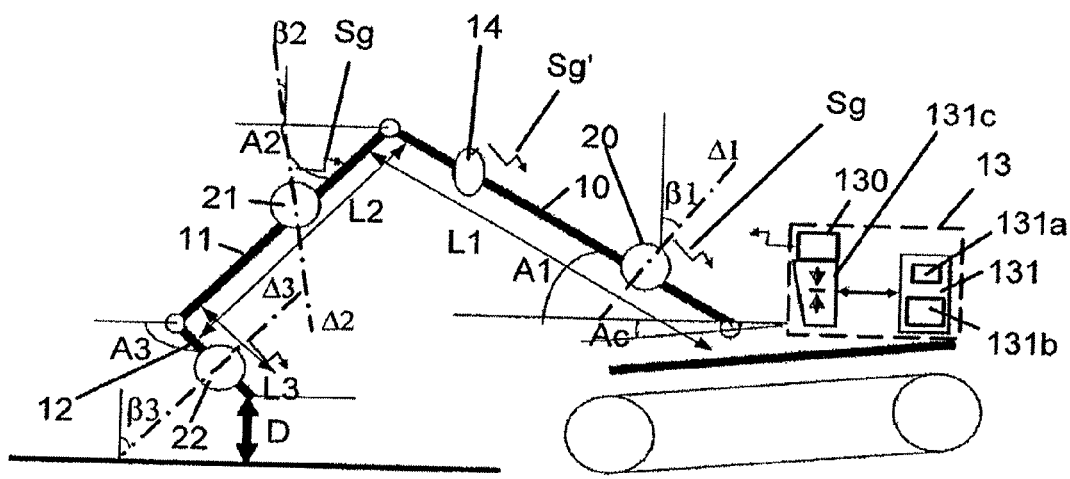
FIG. 3 is an illustration of a preferred embodiment of a works machine equipped with wireless detector devices, used for automatic calibration of the works machine and for controlling the vertical and/or horizontal depth of the bucket type working tool by the use of mathematical relations.

Referring to FIGS. 1, 2 and 3, the method according to the preferred embodiment of the invention applies to excavating machines (1) and more generally to any works machine or earthworking machine equipped with an articulated arm (10, 11) at the end of which is positioned a working tool (12). The method for automatically calibrating the works machine (1) can be used, after a series of movements (1001) of the end of the working tool (12) between reference points placed in accordance with a given geometrical configuration, to collect angular position data ($\beta_i$) relating to the different articulated components (10, 11, 12) of the earthworking machine (1), such as a mechanical shovel, with these angular position data ($\beta_i$) being delivered (1002) by detector devices (20, 21, 22) positioned (1000) in an imprecise manner on each articulated component (10, 11, 12) of the machine (1), and then to execute a calculation module (132) in a system (13) for calibrating the machine (1) so as to determine (1003), by means of known input data (1012), unknown parameters such as the lengths (L1, L2, L3) of the articulated components of the machine and the angular offsets ($\theta 1$, $\theta 2$, $\theta 3$) of each detector device (20, 21, 22) in relation to the articulated component (10, 11, 12) on which it is positioned. These unknown parameters, once determined, and where appropriate after elimination of erroneous input data (1004), can be used, via a program for controlling the luminous indicator display provided on a user interface of the guidance system of the machine (1), so as to guide the operator in the execution of his excavation work.

Advantageously, the preferred embodiment of the invention allows the driver of a public works machine to prepare his machine (1) for the work without requiring the intervention of a specialist technician.

In what follows, and in a manner that is not limiting, the description makes reference to an excavating machine (1) whose articulated arm includes two articulated elements (10, 11) and a working tool (12). In a manner that is not limiting, the preferred embodiment of the invention also applies to excavating machines whose articulated arm includes three, four or more articulated elements.

Typically, this type of machine (1) includes a chassis (100), a support arm (10) attached so that it pivots on the chassis (100), a bucket arm (11) with a first end and a second end, with the first end being attached so that it pivots on the support arm (10), a bucket type working tool (12) attached so that it pivots on the second end of the bucket arm (11), and an actuator system such as actuating hydraulic jacks receiving control signals and that are used to operate the support arm (10), the bucket arm (11) and the bucket (12). The control signals are generated by control levers (131c) located preferably inside a control cab of the excavating machine (1).

Detector devices (20, 21, 22) are placed in an imprecise manner on the different articulated components (10, 11, 12) of the excavating machine (1). In one embodiment, a first detector device (20) is positioned in an imprecise manner on the support arm (10), a second detector device (21) is positioned in an imprecise manner on the bucket arm (11), and a third detector device (22) is positioned in an imprecise manner on the bucket type tool (12) of the excavating machine (1).

By using an electronic angular position sensor module provided within each detector device (20, 21, 22), each detector device (20, 21, 22) determines the angle formed by its respective axis of symmetry ($\Delta 1$, $\Delta 2$, $\Delta 3$) and a reference plane or direction in relation to the vertical in the example shown.

In order to avoid the use of cables, these angular position data are advantageously sent by the detector devices (20, 21, 22) by means of a transmitter with a wireless interface, such as in a radio message. A radio signal that is broadcast omnidirectionally is preferable to an infrared signal that requires directional transmission of the information. The radio transmission is preferably effected in a very short transmission time. The transmission time can be mutually synchronised between the different detector devices (20, 21, 22). This feature allows the saving of energy. The transmitters make use of radio waves at a given frequency for example. Any other short or medium distance wireless communication device can be used equally well.

These detector devices (20, 21, 22) are each powered by an independent power source provided within each detector device (20, 21, 22). This independent power source can, for example and in a manner that is not limiting, be a battery that is charged by one or more solar panels. A conventional auxiliary battery of low capacity can be provided in each detector device (20, 21, 22) to supplement, for a short time, the main battery charged via the solar panels.

In addition, each detector device (20, 21, 22) includes at least one attachment face that is equipped with elements for fixing onto the articulated components (10, 11, 12) of the excavating machine (1). These attachment elements allow the attachment face to be held tight against the flat moving surface of each articulated component (10, 11, 12) of the excavating machine (1). The attachment elements on the attachment face of the detector devices (20, 21, 22) are elements that allow attachment and removal. Each detector device (20, 21, 22) can easily be positioned, lifted off and repositioned, since it is simply held to its support magnetically.

It can therefore be seen that the detector devices (20, 21, 22) are independent and can be mounted initially in a manner that is independent of any other equipment on the support. The detector devices (20, 21, 22) are thus all interchangeable at the start, before the learning and configuration stage that is used to specialise and identify the position on the different articulated components (10, 11, 12) of the excavating machine (1) of each of these detector devices (20, 21, 22). In order to allow specialisation, the wireless-interface transmitter of each detector device (20, 21, 22) can transmit a specific identifier that will be stored in a memory (133) of the calibration system (13) of the excavating machine (1). This identifier is, for example, transmitted in a transmit signal (Sg) such as a radio message. A synchronising signal generated by the calibration system (13) of the excavating machine (1) can also be used to take account of the order of reception of the transmit signals (Sg) and thus to identify the origin of each of the transmit signals (Sg).

The angular position data ($\beta_i$) supplied by the detector devices (20, 21, 22) are processed by the calibration system (13) of the excavating machine (1). Each detector device (20, 21, 22) possesses a wireless communication module to send the information relating to the angular positions ($\beta_i$) to a wireless communication receiver (130) of the calibration system (13) of the excavating machine (1). This calibration system (13) can be powered by the power source present in the cab of the excavating machine (1). The wireless receiver (130) of the calibration system (13) uses radio waves at a given frequency for example. Any other short or medium distance wireless communication device can be used.

In a manner that is not limiting, detector devices (20, 21, 22) wireless or not, magnetised or not, can also be used.

The fitting (stage 1000, FIG. 1) of each detector device (20, 21, 22) is effected, by an operator or user of the excavating machine (1), in an imprecise manner on each articulated component (10, 11, 12) of the excavating machine (1). The respective angles (A1, A2, A3), illustrated in FIG. 3, and used to determine the vertical (D) and/or horizontal (H) depth reached by the bucket type working tool (12) can thus be known to the extent that the angular position of each detector device (20, 21, 22) in relation to the arm (10, 11) and bucket (12) that supports it respectively is a known parameter.

In fact, referring to FIG. 3, the vertical position in depth (D) of the bucket type working tool (12) of the excavating machine (1) in relation to a reference depth (Dr) can be calculated according to the following mathematical relation:

$$D = \sum_{i=1}^{n} (L_i \cdot \sin(A_i)) - Dr \tag{F1}$$

in which n is the number of articulated components (10, 11, 12) of the excavating machine (1);

$L_i$ corresponds to the length of each articulated component (10, 11, 12) of the excavating machine (1), and in the example shown, L1 corresponds to the length of the support arm (10), L2 corresponds to the length of the bucket arm (11) and L3 is the length of the bucket (12); and $A_i$ is the angle formed by the axis of each articulated component (10, 11, 12) of the excavating machine (1) with the horizontal, and in the example shown A1 corresponds to the angle formed by the axis of the support arm (10) with the horizontal, A2 corresponds to the angle formed by the axis of the bucket arm (11) with the horizontal, and A3 corresponds to the angle formed by the axis of the bucket (12) with the horizontal.

In a manner that is not limiting, the reference depth (Dr) can be the horizontal passing through the point of articulation of the support arm (10) with the chassis (100) of the excavating machine (1) or again the horizontal passing through the point of contact of the chassis (100) of the excavating machine (1) with the ground.

It should be noted that the previous mathematical relation (F1) assumes that the orientation of the angles ($A_i$) is provided either in the anticlockwise direction as indicated in FIG. 8a or in the clockwise direction as indicated in FIG. 8b.

Moreover, since the detector devices (20, 21, 22) are positioned (1000) in an imprecise manner on the articulated components (10, 11, 12) of the excavating machine (1), an additional angular offset ($\theta_i$) must be introduced for each angle ($A_i$), such as $\beta_i = A_i + \theta_i$ in which $\beta_i$ corresponds to the angle detected by the detector devices (20, 21, 22) placed respectively on each articulated component (10, 11, 12) of the excavating machine (1) and $A_i$ is the actual angle necessary for the previous equation (F1).

The mathematical relation (F1) can be reformulated so as to facilitate the calculation and the determination (1003, FIG. 1) of the unknown parameters ($L_i$ and $\theta_i$).

In order to simplify the writing of the following equations, a height h=D+Dr is considered so that:

$$h = \sum_{i=1}^{n} (L_i \cdot \sin(A_i)) \tag{F2}$$

F2 can be rewritten as follows:

$$h = \sum_{i=1}^{n} L_i \cdot \sin(\beta_i - \theta_i)$$

$$h = \sum_{i=1}^{n} L_i \cdot (\sin(\beta_i)\cos(\theta_i) - \cos(\beta_i)\sin(\theta_i))$$

$$h = \sum_{i=1}^{n} L_i \cos(\theta_i) \cdot \sin(\beta_i) - L_i \sin(\theta_i) \cdot \cos(\beta_i)$$

By determining two new unknown parameters, $a_i = L_i \cos(\theta_i)$ and $b_i = -L_i \sin(\theta_i)$, the following equation (F3) is obtained:

$$h = \sum_{i=1}^{n} a_i \cdot \sin(\beta_i) + b_i \cdot \cos(\beta_i) \tag{F3}$$

Naturally, the horizontal depth (H) of the bucket type working tool (12) of the excavating machine (1) can be calculated in a similar manner. Non-linear equation (F'2) associated with non-linear equation (F2) is written as follows:

$$H = \sum_{i=1}^{n} (L_i \cdot \cos(A_i)) \tag{F2'}$$

and the corresponding linear equation (F3'), using the new parameters $a_i$ and $b_i$ described previously, is written as follows:

$$H = \sum_{i=1}^{n} a_i \cdot \cos(\beta_i) - b_i \cdot \sin(\beta_i) \tag{F3'}$$

The invention can thus be used, prior to controlling the working tool (12) for one's work, to determine the unknown parameters of the previous mathematical relations, namely:

the lengths (L1, L2, L3), respectively, of the support arm (10), the bucket arm (11), and the bucket (12);

the angular offsets (θ1, θ2, θ3) of the detector devices (20, 21, 22).

It should be noted that once determined, these parameters (L1, L2, L3, $\theta_i$) remain constant during the operation of the excavating machine (1) which allows one to precisely guide the operator to work at a determined vertical and/or horizontal depth of the bucket (12).

So as to determine the data for the angular position ($\beta_i$) of each detector device (20, 21, 22) in relation to the vertical, each detector device (20, 21, 22) includes an angular position sensor built into an electronic device. In a manner that is not limiting, any suitable angular position measuring equipment can be mounted in these detector devices (20, 21, 22).

Once each detector device (20, 21, 22) is positioned (stage 1000, FIG. 1) in an imprecise manner on the support arm (10), the bucket arm (11) and the bucket type tool (12), an operator then controls the movement (stage 1001, FIG. 1) of the articulated components (10, 11, 12) of the excavating machine (1), by means of the control levers (131c) on the machine (1), over a multiplicity of predetermined reference points placed in accordance with a given geometrical configuration.

In a manner that is not limiting, the reference points can be placed in different geometrical configurations that are created by means of at least one appropriate device of the laser type, or again by a rod on which markers are placed or any other similar device forming a reference plane or line.

The distances between reference planes or lines on which the reference points of the different geometrical configurations are positioned, or the distances between the reference points, or again the coordinates of reference points, are known and form what will be henceforth called the known input data. These known input data are entered by the operator on the keyboard (131b) of the user interface (131) of the calibration system (13), and then stored in the memory (133) of the calibration system (13) of the excavating machine. As seen below, these stored data will be used for the calculation and determination of the unknown parameters ($L_i$ and $\theta_i$).

Examples of geometrical configurations of the reference points are going to be described on which the ends of the articulated components (10, 11, 12) of the excavating machine (1) are positioned. In a manner that is not limiting, other geometrical configurations of reference points on which the end of the working tool is positioned, in particular the teeth of the bucket (12) of the excavating machine (1), so as to determine the unknown parameters ($L_i$ and $\theta_i$), can be envisaged. The geometrical configurations are geometrical combinations of reference planes or lines, which are vertical or horizontal or oriented at a known angle.

Referring to FIG. 4, in a preferred embodiment, the operator, by means of control levers (131c) on the excavating machine (1), controls the movement of the end of the bucket type tool (12) over a first series of reference points (M1, M2, M3, . . . , Mi) placed according to a first horizontal reference laser plane or line (P). Then the operator controls the movement of the end of the bucket type tool (12) over another series of reference points (M'1, M'2, M'3, . . . , M'i) placed according to a second horizontal reference laser plane or line (P') which is parallel to the first reference laser plane or line (P). The distance (DPP') between these two reference laser planes or lines (P, P') is known, having been entered by the operator on the keyboard (131b) and then stored in the memory (133) of the calibration system (13) of the excavating machine (1).

Referring now to FIG. 5, a first implementation variant of the stage for movement (1001, FIG. 1) of the articulated components (10, 11, 12) of the excavating machine (1) is described.

Referring to FIG. 5a, the operator, by means of control levers (131c) on the excavating machine (1), controls the movement of the end of the bucket type tool (12) over a first series of reference points, over three reference points (O1, O2, O3) in the example shown, placed according to a reference line (O). This vertical reference line (O) is formed by a rod on which markers are placed, corresponding to the reference points (O1, O2, O3). Then, referring to FIG. 5b, the operator moves the rod forming the reference line (O) to the chassis (100) of the excavating machine (1) while keeping the vertical orientation of the rod so that it controls the movement of the end of the bucket type tool (12) over another series of reference points, over three other reference points (O'1, O'2, O'3) in the example shown, placed according to a second vertical reference line (O') that is parallel to the first reference plane (O). The distances (DO1O2, DO2O3) or (DO'1O'2, DO'2O'3) between respectively each reference point (O1, O2, O3) or (O'1, O'2, O'3) are known, having been entered by the operator on the keyboard (131b) and then stored in the memory (133) of the calibration system (13) of the excavating machine (1). The horizontal distance (DOO') separating these two reference lines (O, O') is known, having been entered by the operator on the keyboard (131b) and then stored in the memory (133) of the calibration system (13) of the excavating machine (1), and the vertical movement (hOO') formed by the height difference between the two reference lines (O, O') as illustrated in FIG. 5c.

It should be noted that the vertical movement (hOO') of the rod can be determined by using a graduation on the rod forming the reference line (O, O') for example, in order to read these movements in relation to a horizontal laser beam.

Moreover, if the rod forming the second reference line (O') is placed higher in relation to the first position forming the first reference line (O), then the vertical movement (hOO') is positive. Otherwise it is negative.

The movement of the rod in the direction of the chassis (100) of the excavating machine (1) can be repeated several times so that the end of the bucket type working tool (12) is positioned at other reference points placed according to other vertical reference lines ($O_k$) parallel to the first reference line (O). In like manner, the distances between these reference lines ($O_k$) are known, having been entered by the operator on the keyboard (131b) and then stored in the memory (133) of the calibration system (13) of the excavating machine (1).

It should be noted that the distances between the reference points, corresponding to the markers on the rod, remain unchanged when moving the rod, that is for each reference line ($O_k$).

Referring to FIG. 6, a second implementation variant of the stage for movement (1001, FIG. 1) of the articulated components (10, 11, 12) of the excavating machine (1) is described.

Figure 6A:
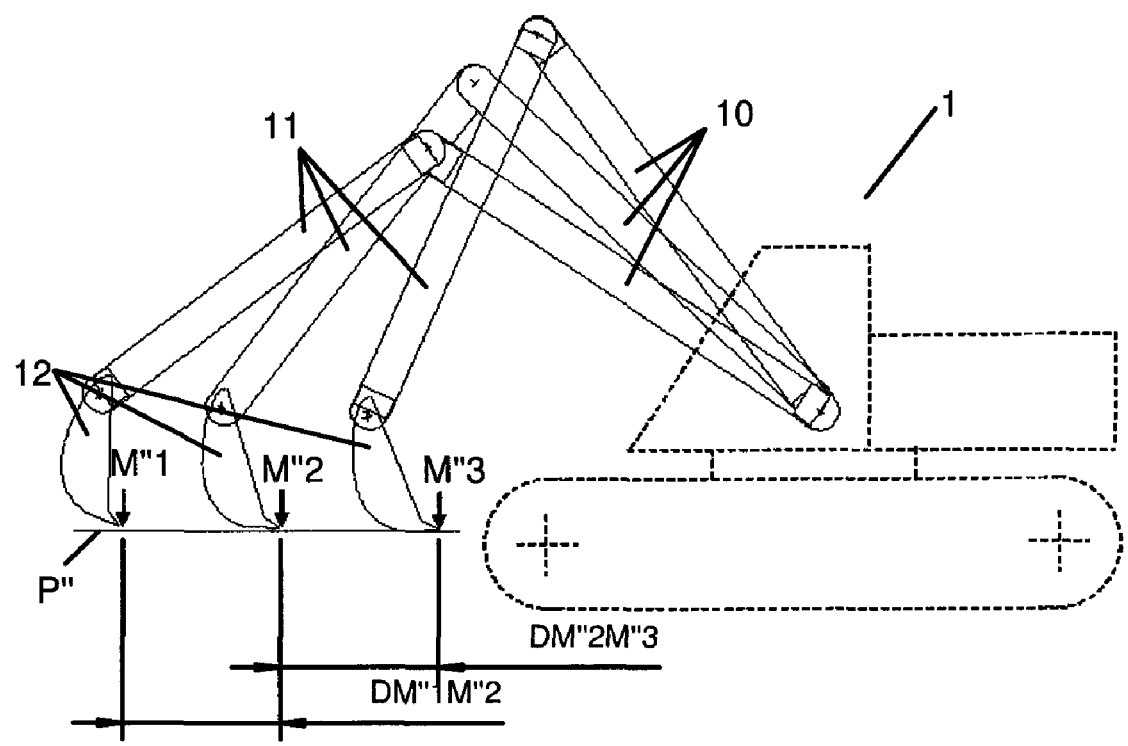
FIG. 6 is an illustration of a second variant of the stage for moving the end of the working tool of the works machine of the automatic calibration method according to the preferred embodiment of the invention, where this second variant includes moving the end of the working tool of the works machine to different reference points on a horizontal reference plane or line (this movement being illustrated in FIG. 6a), and then for each reference point, of pivoting the end of the working tool of the works machine about these reference points (this pivoting being represented in FIG. 6b)
Figure 6B:
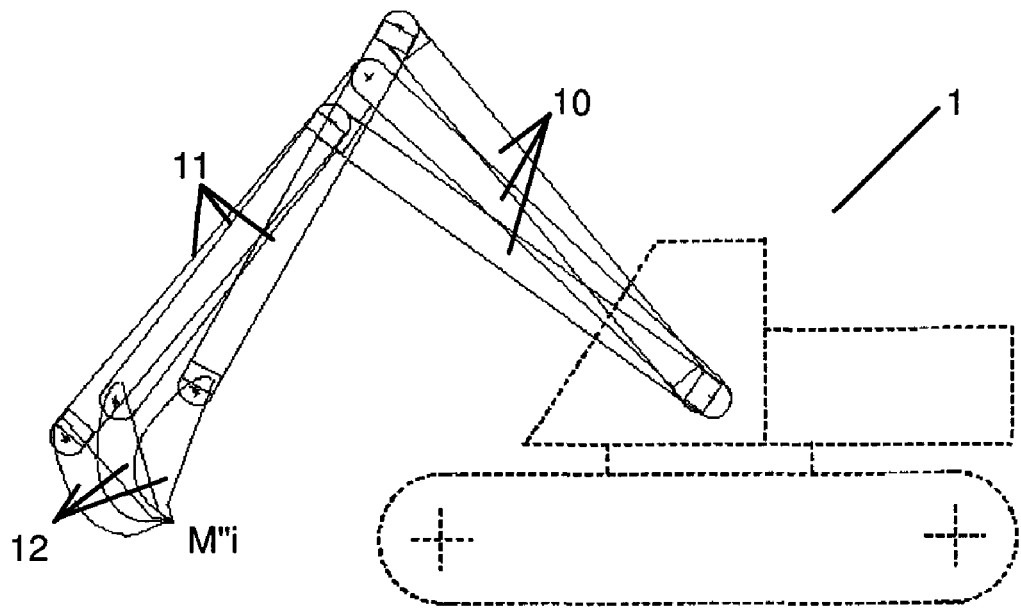

Referring to FIG. 6a, the operator, by means of control levers (131c) on the excavating machine (1), controls the movement of the end of the bucket type tool (12) over a first series of reference points, over three reference points (M"1, M"2, M"3) in the example shown, placed according to a reference line (P'"). This horizontal reference line (P'") is formed by another rod on which markers are placed corresponding to reference points (M"1, M"2, M"3). The distances (DM"1M"2, DM"2M"3) between the reference points (M"1, M"2, M"3) are known, having been entered by the operator on the keyboard (131b) and then stored in the memory (133) of the calibration system (13) of the excavating machine (1). For each reference point (M"1, M"2, M"3) placed on the reference line (P"), the operator can also (referring to FIG. 6b) control the pivoting of the end of the bucket type tool (12) about each reference point (M"1, M"2, M"3).

It will be seen that each angular combination resulting from the positioning of the end of the bucket (12) will give rise to an additional equation that can be used for solving the equation systems, and therefore for finding the unknown parameters.

Referring to FIG. 7, a third implementation variant of the stage for movement (1001, FIG. 1) of the articulated components (10, 11, 12) of the excavating machine (1) is described.

Referring to FIG. 7a, in this third implementation variant, the operator, by means of control levers (131c) on the excavating machine (1), controls the movement of the end of the bucket type tool (12) over a multiplicity of reference points (N0, N1, N2, N3, N4). Two reference points (N1 and N3) are placed on a first horizontal reference laser plane (PN1N3), and two other reference points (N2 and N4) are placed on a second horizontal reference laser plane (PN2N4), and parallel to the first reference plane (PN1N3). In addition, another reference point (N0) is provided, so that the bucket (12) adopts a vertical position. The vertical position of the bucket (12) forms an axis of symmetry for the reference points (N1, N3) placed on the first reference laser plane (PN1N3) and for the reference points (N2, N4) placed on the second reference laser plane (PN2N4). As a consequence, the coordinates of the point (N0) can be deduced easily in view of the geometrical configuration of the reference points (N1, N2, N3, N4) (in fact, the angle that has as its centre the point of articulation of the bucket (12) on the bucket arm (11), and formed by point (N0) and reference point (N2) or (N4), corresponds to half of the angle with the same centre and formed by points (N2) and (N4), or again the angle that has as its centre the point of articulation of the bucket (12) on the bucket arm (11) and formed by point N0 and reference point (N1) or (N3), corresponds to half of the angle with the same centre and formed by points (N1) and (N3)). The distance (DN) between the two reference laser planes (PN1N3, PN2N4) is known and stored in the memory (133) of the calibration system (13) of the excavating machine (1). It should be noted that when moving the end of the bucket (12), the support arm (10) and the bucket arm (12) remain fixed.

Advantageously, this first series of movements of the end of the bucket (12) of this third implementation variant can be used, by virtue of the angular position data detected by the detector device (22) positioned on the bucket (12), and then transmitted to the calculation module (132) of the calibration system (13), and by virtue of the stored distance (DN), to determine the angular offset (θ3) of the detector device (22) of the bucket (12) in a first stage, and the length (L3) of the bucket (12) in a second stage.

Next, referring to FIG. 7b, the operator, by means of control levers (131c) on the excavating machine (1), controls the movement of the end of the bucket arm (11) according to the same geometrical configuration of the reference points (N'0, N'1, N'2, N'3, N'4) as that described previously for moving the end of the bucket (12). In fact, two reference points (N'1 and N'3) are placed on a first horizontal reference laser plane (PN'1N'3) and two other reference points (N'2 and N'4) are placed on a second horizontal reference laser plane (PN'2N'4) parallel to the first reference laser plane (PN'1N'3). In addition, another reference point (N'0) is provided so that the bucket arm (11) adopts a vertical position. The distance (DN') between the two reference planes (PN'1N'3, PN'2N'4) is known and stored in the memory (133) of the calibration system (13) of the excavating machine (1). It should be noted that when moving the end of the bucket arm (11), the support arm (10) remains fixed.

Advantageously, this second series of movements of the end of the bucket arm (11) of this third implementation variant can be used, by virtue of the angular position data detected by the detector device (21) positioned on the bucket arm (11), and then transmitted to the calculation module (132) of the calibration system (13), and by virtue of the stored distance (DN'), to determine the angular offset (θ2) of the detector device (21) of the bucket arm (11) in a first stage, and the length (L2) of the bucket arm (11) in a second stage.

Finally, referring to FIG. 7c, the operator, by means of control levers (131c) on the excavating machine (1), controls the movement of the end of the support arm (10), that is the point of articulation between the support arm (10) and the bucket arm (11), over two reference points (N"1, N"2) placed on a vertical reference laser plane (PN1") perpendicular to another horizontal reference laser plane (PN2") that includes a reference point (N"0) on which the end of the bucket (12) is positioned and fixed when moving the end of the support arm (10). The distance (DN") between the reference point (N"0) and the intersection point (N"i) of the two reference laser planes (PN1", PN2") is known and stored in the memory (133) of the calibration system (13) of the excavating machine (1).

Advantageously, this third series of movements of the end of the support arm (10) of this third implementation variant can be used, by virtue of the angular position data detected by the detector device (20) positioned on the support arm (10), and then transmitted to the calculation module (132) of the calibration system (13), and by virtue of the stored distance (DN"), to determine the angular offset (θ1) of the detector device (20) of the support arm (10) in a first stage, and the length (L1) of the support arm (10) in a second stage.

In a given geometrical configuration, and for each position taken by the end of the bucket (12) in this given geometrical configuration, the angular position sensor mounted in each detector device (20, 21, 22) supplies the angular position data $(\beta_i)$, representing the angle formed by the axis of symmetry ($\Delta 1$, $\Delta 2$, $\Delta 3$) of each detector device (20, 21, 22) and the vertical, to a processing unit provided in each detector device (20, 21, 22). The wireless communication module of each detector device (20, 21, 22) at once transfers (stage 1002, FIG. 1) these angular position data $(\beta_i)$ to the calibration system (13) of the excavating machine (1), via the wireless-interface transmitter of each detector device (20, 21, 22) connected respectively to the processing unit of each detector device (20, 21, 22). These angular position data $(\beta_i)$ are sent remotely via a transmit signal (Sg), preferably radio.

The calibration system (13) of the excavating machine (1) collects, remotely and without a cable, the angular position data generated by the different detector devices (20, 21, 22) and associated with each reference position, via the wireless communication receiver (130) that is connected to the memory (133) of the calibration system (13) of the excavating machine (1).

These angular position data $(\beta_i)$ associated with each reference point, that is with each position taken by the end of the bucket (12), are then stored in the memory (133) of the calibration system (13) of the machine (1).

In a preferred embodiment, every time the operator positions the end of the working tool (12) on a reference point, using control levers (131c) and the naked eye, the operator triggers the measurement, and then the transmission and the storage, described previously, of the angular position data supplied by the detector devices (20, 21, 22), by pressing a validation button (not shown) provided on the user interface (131) of the calibration system (13) of the machine (1).

In an implementation variant, in the case in which the reference planes or lines of the determined geometrical configurations are created by laser devices, a laser detector (not shown) can be placed at the end of the working tool (12) so as to determine the moment at which the end of the working tool (12) is positioned at a reference point of a reference laser plane or line, and thus to automatically trigger the measurement, followed by transmission and storage, described previously, of the angular position data ($β_i$) supplied by the detector devices (20, 21, 22). In order to perform the automatic triggering, the laser detector is equipped with a wireless communication module to send one or more trigger signals for measurement of the angular position data intended for the detector devices (20 21 22). The laser detector can be independent in the same manner as the angular position detector devices (20, 21, 22) and can communicate by radio.

In a given geometrical configuration, and for each position taken by the end of the bucket (12) in this given geometrical configuration, the angular position data ($β_i$) associated with each reference point, and stored in the memory (133) of the calibration system (13), are then transmitted (stages 1002, FIG. 1) to the calculation module (132) of the calibration system (13).

This calculation module (132) is designed, to calculate and determine (stage 1003, FIG. 1) the unknown parameters ($L_i$ and $θ_i$), by means of an appropriate program for the solution of mathematical equations using the known input data entered by the operator and stored (stage 1012, FIG. 1) in the memory (133) of the calibration system (13) for a given geometrical configuration associated with the angular position data ($β_i$) measured and received (stage 1002, FIG. 1) for each position of the end of the bucket (12) for this given geometrical configuration.

In a manner that is not limiting, different methods or programs for the solution of mathematical equations in the calculation module (132) of the calibration system (13) of the excavating machine (1) can be envisaged so as to determine and calculate (stage 1003, FIG. 1) the unknown parameters ($L_i$ and $θ_i$). The mathematical equations are obtained from the mathematical relations, described previously, determining the data representing the vertical position (h) and the horizontal position (H) of the working tool (12) in accordance with the unknown parameters.

The solution of the system of mathematical equations is effected by the program that is executed by the calculation module (132) of the calibration system (1), solving a matrix system (SM) containing, for the given geometrical configuration and for each position of the said geometrical configuration taken by the end of the working tool (12), the angular position data ($β_i$) of each articulated component (10, 11, 12) of the machine (1) and the known input data relating to this geometrical configuration, or using one or more appropriate mathematical methods.

Some examples of mathematical solution methods are now going to be described. In a manner that is not limiting, other mathematical solution methods can also be envisaged.

The calculation method or methods use(s) the non-linear equation (F2) and the equivalent non-linear equation (F2'), that is the non-linear equation (F2') associated with the horizontal depth (H) of the bucket type working tool (12), so as to determine the unknown parameters ($L_i$ and $θ_i$). In this case, this gives rise to a problem of estimating non-linear parameters that can be solved by using non-linear optimisation algorithms or non-linear solution devices using the method of least squares. The appropriate non-linear optimisation methods include, for example, and in a manner that is not limiting, Newtonian or quasi-Newtonian methods or a Trust-Region method or indeed a Nelder-Mead method. The non-linear solution devices using the method of least squares include, for example, and in a manner that is not limiting, a Gauss-Newton method or a Levenberg-Marquardt method.

Other calculation methods employ the equation system (F3, F3') described previously. In this case, we arrive at a system of linear equations that can be used, easily and rapidly, to determine the unknown parameters ($L_i$ and $θ_i$). In these methods, determination of the unknown parameters ($L_i$ and $θ_i$) involves determining new unknown parameters, namely $a_i$ and $b_i$.

In what follows, and in a manner that is not limiting, a first mathematical method is going to be described which is associated with the geometrical configuration of the reference points of the preferred embodiment, described previously. This first method uses linear equation system (F3, F3').

When the end of the bucket type working tool (12) is positioned at the first reference point (M1) of the first horizontal reference laser plane or line (P), each detector device (20, 21, 22) supplies, to the calculation module (132) of the calibration system (13) of the excavating machine (1), the angular position data relating to the articulated components (10, 11, 12) on which they are positioned. The angular position data relating to the articulated components (10, 11, 12) are stored, for the associated position, in the memory (133) of the calibration system (13) of the excavating machine (1). The same operations are performed for the other reference points (M2, M3, . . . , Mi) of the first reference laser plane or line (P), and then for the reference points (M'1, M'2, M'3, . . . , M'i) of the second horizontal reference laser plane or line (P') parallel to the first reference laser plane or line (P).

In this way, the memory (133) of the calibration system (13) of the excavating machine (1) includes:

a first set ($\overline{β}^{(1)}$) of angular position data supplied by the detector devices (20, 21, 22) for each position of the end of the bucket (12) on the first reference laser plane or line (P), such as $\overline{β}^{(1)} = \{\overline{β}^{(1,1)}, \ldots, \overline{β}^{(1,N_1)}\}$ in which $N_1$ is the number of positions taken up by the end of the bucket (12) on the first reference laser plane or line (P) (i.e. the number of reference points on the first reference laser plane (P)), and $\overline{β}^{(1,k)}$ is the vector of the angles detected by the detector devices (20, 21, 22) for the $k^{th}$ positions of the end of the bucket (12) on the first reference plane or line (P); and a second set ($\overline{β}^{(2)}$) of angular position data supplied by the detector devices (20, 21, 22) for each position of the end of the bucket (12) on the second reference laser plane or line (P'), such as $\overline{β}^{(2)} = \{\overline{β}^{(2,1)}, \ldots, \overline{β}^{(2,N_2)}\}$ in which $N_2$ is the number of positions taken up by the end of the bucket (12) on the second reference laser plane or line (P'), and $\overline{β}^{(2,k)}$ is the vector of the angles detected by the detector devices (20, 21, 22) for the $k^{th}$ positions of the end of the bucket (12) on the second reference plane or line (P').

It should be noted that if the second reference plane or line (P') is higher than the first reference plane (P), then the distance (DPP') separating these two reference planes or lines (P, P') is positive, and if the second reference plane (P') is lower than the first reference plane (P), then the distance (DPP') separating these two reference planes or lines (P, P') is negative. Moreover, in order to obtain calibration results of high accuracy, the distance (DPP') between the two reference planes or lines (P, P') must be as large as possible.

From the first set ($\overline{β}^{(1)}$) of angular position data, and using the linear equation (F3), the following equation systems (Fa1)

is obtained by considering that the end of the bucket type working tool (12) is always placed at the same height (ho), which is unknown:

$$\sum_{i=1}^{n} ai \cdot \sin(\beta_i^{(1,1)}) + bi \cdot \cos(\beta_i^{(1,1)}) - ho = 0 \quad \text{(Fa1)}$$

$$\vdots$$

$$\sum_{i=1}^{n} ai \cdot \sin(\beta_i^{(1,N_1)}) + bi \cdot \cos(\beta_i^{(1,N_1)}) - ho = 0$$

From the second set ($\bar{\beta}^{(2)}$) of angular position data, and using the linear equation (F3), the following equation systems is obtained (Fa2) by considering that the end of the bucket type working tool (12) is placed at the height (ho+DPP'), which is equal to the sum of the height (ho) of the first reference plane or line (P) and the known distance (DPP') separating the two planes or reference line (P, P'):

$$\sum_{i=1}^{n} ai \cdot \sin(\beta_i^{(2,1)}) + bi \cdot \cos(\beta_i^{(2,1)}) - ho = DPP'$$

$$\vdots$$

$$\sum_{i=1}^{n} ai \cdot \sin(\beta_i^{(2,N_2)}) + bi \cdot \cos(\beta_i^{(2,N_2)}) - ho = DPP'$$

(Fa2)

Writing of the complete equation system (Fa1, Fa2) is reformulated so that a matrix system (SM) is obtained such as $A \cdot x = c$ where $x = (a_1, b_1, \ldots, a_n, b_n, h_0)^T$, with line N1 of A having the following form: $(\sin(\bar{\beta}_1^{(1,k)}), \cos(\bar{\beta}_1^{(1,k)}), \ldots, \sin(\bar{\beta}_n^{(1,k)}), \cos(\bar{\beta}_n^{(1,k)}), -1)$, line N2 of A having the following form: $(\sin(\bar{\beta}_1^{(2,k)}), \cos(\bar{\beta}_1^{(2,k)}), \ldots, \sin(\bar{\beta}_n^{(2,k)}), \cos(\bar{\beta}_n^{(2,k)}), -1)$, and vector c consists of N1 times 0 followed by N2 times (DPP').

In what follows, and in a manner that is not limiting, a second mathematical method is now going to be described which is associated with the geometrical configuration of the reference points of the first implementation variant, described previously. This second method also uses the linear equation system (F3, F3').

When the end of the bucket type working tool (12) is positioned at the first reference point (O1) of the first vertical reference laser line (O), each detector device (20, 21, 22) supplies, to the calculation module (132) of the calibration system (13) of the excavating machine (1), the angular position data relating to the articulated components (10, 11, 12) on which they are positioned. The angular position data relating to the articulated components (10, 11, 12) are stored, for the associated position, in the memory (133) of the calibration system (13) of the excavating machine (1). The same operations are performed for the other reference points (O2, O3) of the first reference laser line (O), and then for the reference points (O'1, O'2, O'3) of the second vertical reference laser line (O'), parallel to the first reference laser line (O), and for the other reference points placed according to other verticals reference lines ($O_K$) parallel to the first reference line (O).

In this way, the memory (133) of the calibration system (13) of the excavating machine (1) includes a set ($\bar{\beta}$) of angular position data supplied by the detector devices (20, 21, 22) for each position of the end of the bucket (12) on the reference points of each reference line formed by the rod, such that:

$$\bar{\beta} = \{\bar{\beta}^{(1,1)}, \bar{\beta}^{(2,1)}, \bar{\beta}^{(3,1)}, \ldots, \bar{\beta}^{(1,N)}, \bar{\beta}^{(2,N)}, \bar{\beta}^{(3,N)}\}$$

in which N is the number of reference lines formed by the movement of the rod, and $\bar{\beta}^{(i,k)}$ is the vector of the angles detected by the detector devices (20, 21, 22) for the position of the end of the bucket (12) at reference point i on the $k^{th}$ reference line. i=1 is taken for the reference point that is lowest on the rod, i=2 for the reference point in the middle of the rod, and i=3 for the reference point that is highest on the rod. The known distance between reference line k and k+1 with k=1, . . . , N−1 is denoted $d_k$, and the known vertical movement for reference line k, with k=2, . . . , N in relation to the first position of the rod, that is of the first reference line (O), is denoted $h_{k-1}$.

It should be noted that in order to obtain calibration results of high precision, the known distance ($d_k$) between two reference lines must be as large as possible.

For the first reference point (O1) of the first reference line (O), the end of the bucket (12) is placed at a height (ho) that is not known on the lowest reference point. The reference point (O2) in the middle is placed at a height (ho+DO1O2) that is equal to the sum of the unknown height (ho) and the known distance (DO1O2) separating the bottom reference point (O1) and the adjacent reference point (O2) in the middle. The top reference point (O3) is placed at a known height (ho+DO2DO3) separating the reference point (O2) in the middle and the adjacent reference point (O3) at the top. Using the vectors associated with each reference point (O1, O2, O3) for the first reference plane (O), and from the linear equation (F3), the following three equations are obtained:

$$\sum_{i=1}^{n} ai \cdot \sin(\beta_i^{(1,1)}) + bi \cdot \cos(\beta_i^{(1,1)}) - ho = 0 \quad \text{(Fb1)}$$

$$\sum_{i=1}^{n} ai \cdot \sin(\beta_i^{(2,1)}) + bi \cdot \cos(\beta_i^{(2,1)}) - ho = DO1O2 \quad \text{(Fb2)}$$

$$\sum_{i=1}^{n} ai \cdot \sin(\beta_i^{(3,1)}) + bi \cdot \cos(\beta_i^{(3,1)}) - ho = DO2O3 \quad \text{(Fb3)}$$

Furthermore, the linear equation (F3') described previously, can be reformulated so as to give the following equations:

$$\left(\sum_{i=1}^{n} ai \cdot \cos(\beta_i^{(2,1)}) - bi \cdot \sin(\beta_i^{(2,1)})\right) - \left(\sum_{i=1}^{n} ai \cdot \cos(\beta_i^{(1,1)}) - bi \cdot \sin(\beta_i^{(1,1)})\right) = 0 \quad \text{(Fb4)}$$

$$\left(\sum_{i=1}^{n} ai \cdot \cos(\beta_i^{(3,1)}) - bi \cdot \sin(\beta_i^{(3,1)})\right) - \left(\sum_{i=1}^{n} ai \cdot \cos(\beta_i^{(1,1)}) - bi \cdot \sin(\beta_i^{(1,1)})\right) = 0 \quad \text{(Fb5)}$$

For each of the three reference positions of each reference line, the equations are equivalent to that expressed above for the three reference points (O1, O2, O3) of the first reference line (O). The difference is that the bottom reference point for reference line k, with k=2, . . . , N is moved vertically by $h_{k-1}$ in relation to ho.

The following equations are obtained for k=2, . . . , N forming a total of 5(N−1) additional equations:

$$\sum_{i=1}^{n} ai \cdot \sin(\beta_i^{(1,k)}) + bi \cdot \cos(\beta_i^{(1,k)}) - ho = h_{k-1} \quad \text{(Fb6)}$$

$$\sum_{i=1}^{n} ai \cdot \sin(\beta_i^{(2,k)}) + bi \cdot \cos(\beta_i^{(2,k)}) - ho = h_{k-1} + DO1O2 \quad \text{(Fb7)}$$

$$\sum_{i=1}^{n} ai \cdot \sin(\beta_i^{(3,k)}) + bi \cdot \cos(\beta_i^{(3,k)}) - ho = h_{k-1} + DO2O3 \quad \text{(Fb8)}$$

$$\left( \sum_{i=1}^{n} \begin{array}{c} ai \cdot \cos(\beta_i^{(2,k)}) - \\ bi \cdot \sin(\beta_i^{(2,k)}) \end{array} \right) - \left( \sum_{i=1}^{n} \begin{array}{c} ai \cdot \cos(\beta_i^{(1,k)}) - \\ bi \cdot \sin(\beta_i^{(1,k)}) \end{array} \right) = 0 \quad \text{(Fb9)}$$

$$\left( \sum_{i=1}^{n} \begin{array}{c} ai \cdot \cos(\beta_i^{(3,k)}) - \\ bi \cdot \sin(\beta_i^{(3,k)}) \end{array} \right) - \left( \sum_{i=1}^{n} \begin{array}{c} ai \cdot \cos(\beta_i^{(1,k)}) - \\ bi \cdot \sin(\beta_i^{(1,k)}) \end{array} \right) = 0 \quad \text{(Fb10)}$$

The calibration system (13) has also stored the information relating to the distances separating each reference line ($O_k$), which can be used to acquire N−1 additional equations. With the aim of formulating these equations, it is necessary to calculate the horizontal distances $\tilde{d}_k$ of the positions of the rod from the measured distances $d_k$ separating two adjacent reference lines, for k=1, ..., N−1. The following equation is thus obtained:

$$\tilde{d}_k = \sqrt{d_k^2 - (h_k - h_{k-1})^2}, \ k=1, \ldots, N-1 \quad \text{(Fb1)}$$

in which ho=0 is set.

And using the linear equation (F3'), the following equation is obtained (Fb12):

$$\left( \sum_{i=1}^{n} \begin{array}{c} ai \cdot \cos(\beta_i^{(1,k+1)}) - \\ bi \cdot \sin(\beta_i^{(1,k+1)}) \end{array} \right) - \left( \sum_{i=1}^{n} \begin{array}{c} ai \cdot \cos(\beta_i^{(1,k)}) - \\ bi \cdot \sin(\beta_i^{(1,k)}) \end{array} \right) = \tilde{d}_k$$

$$k = 1, \ldots, N-1$$

By bringing together all the equations (Fb1 to Fb12) described previously, a linear equation system of unknowns $x=(a_1, b_1, \text{etc.}, a_n, b_n, ho)$ that can be written in matrix form is obtained.

As for the first mathematical method described previously, a matrix system (SM) of linear equation M such as A·x=c, in which either M=$N_1$+$N_2$ (the first method described previously) or M=6N−1 (the second method) is obtained. By solving this matrix system (SM), the calculation module (132) of the calibration system (13) of the excavating machine (1) is designed to determine the parameters $a_i$ and $b_i$, which were unknown up to then, for each articulated component (10, 11, 12) of the excavating machine (1).

Having found $a_i$ and $b_i$, i=1, ..., n, in our implementation example, the parameters (a1, b1) associated with the support arm (10), the parameters (a2, b2) associated with the bucket arm (11), and the parameters (a3, b3) associated with the bucket (12), via the matrix system (SM), then the parameters of the lengths (L) and of the angular offsets ($\theta_i$) of each articulated component (10, 11, 12) of the excavating machine (1), necessary to control the vertical (D) or horizontal (H) depth of the bucket (12), using equation (1), are given by the following formulae (Fc1, Fc2):

$$L_i = \sqrt{a_i^2 + b_i^2} \quad \text{(Fc1)}$$

and $$\theta_i = -\arctan\left(\frac{b_i}{a_i}\right) \quad \text{(Fc2)}$$

It should be noted that the matrix system (SM) must be solved for the 2n+1 unknowns of the second member (x) of the matrix system (SM). First of all though, the number of equations (M) of the matrix system (SM) must not be less than the numbers of unknowns 2n+1, where n is equal to the number of articulated components of the excavating machine (1). In our implementation example, the support arm (10), the bucket arm (11) and the bucket (12) are articulated, and each is fitted with a detector device (20, 21, 22) with n=3 which makes 7 unknown parameters, namely the 3 lengths (L1, L2, L3) and the 3 angular offsets (θ1, θ2, θ3) of each of the articulated components (10, 11, 12) to be determined, and the height (ho) of the first reference plane of the given geometrical configuration.

If the number of equations (M) of the matrix system (SM) is less than the numbers of unknowns 2n+1, it is not possible to have a unique solution for each parameter to be determined.

Moreover, with exactly 2n+1 equations, the solution of the matrix system (SM), that is the determined parameters, is not precise since the measured angular position data can contain measurement errors.

In fact, in the normal working conditions of the excavating machine (1), measurement errors can appear. As an example, the movements of the end of the articulated components (10, 11, 12) of the excavating machine (1) over the reference points are effected with the naked eye by an operator and, as a consequence, are not all precise, which induces a variation of the angular position data ($\beta_i$) supplied by the detector devices (20, 21, 22).

If some of the measured data are inaccurate, this introduces a large error into the calibration method, and in particular into the values of the parameters to be determined.

The calculation module (132) of the calibration system (13) of the excavating machine (1) can take account of these measurement errors.

The calibration method can thus include a stage for determination and elimination (1004) of the erroneous entry data and angular positions ($\beta_i$) that are created by a program that is executed by the calculation module (132) of the calibration system (1) using one or more appropriate mathematical methods, with the erroneous entry data and angular positions ($\beta_i$) being eliminated from the data set necessary for calculating the unknown parameters ($L_i$, $\theta_i$).

Some examples of mathematical solutions are now going to be described so as to determine and eliminate the measurement errors. In a manner that is not limiting, other mathematical solution methods can be envisaged equally well.

Firstly, the calculation module (132) is designed to determine the influence of the measurement errors.

In order to determine the influence of the measurement errors, it is necessary to supply enough measured data in order to obtain more than 2n+1 equations.

For the matrix system (SM), an approximate solution can be found so that a parameter of the vector (x) of the matrix system (SM) minimises the difference between the first member (A·x) and the second member (c) of the equality of the matrix system (SM).

Generally speaking, minimisation is considered in relation to functions of the form $$\sum_{k=1}^{M}\left|c_k - \left(\sum_{j=1}^{2n+1} A_{k,j} \cdot x_j\right)\right|^\mu, \mu \in N$$

or of another form $$\sum_{k=1}^{M} w_k \left|c_k - \left(\sum_{j=1}^{2n+1} A_{k,j} \cdot x_j\right)\right|^\mu$$

in which $W_k$ are weighting coefficients adjusted by algorithm or imposed.

For the matrix system (SM), the most appropriate method is to solve it using the method of the least squares, which consists of finding the value of x so that the residual sum of the squares (rss) is minimum, with $$rss = \sum_{k=1}^{M}\left(c_k - \left(\sum_{j=1}^{2n+1} A_{k,j} \cdot x_j\right)\right)^2.$$

In order to find a solution to this minimisation problem, the appropriate solution methods are also Newtonian or quasi-Newtonian methods, or indeed conjugate gradient methods. Because of the structure of the equation for the residual sum (rss), use of the Newtonian method would in this case be equivalent, by solving the normal equation $A^T A \cdot x = A^T \cdot c$. Since the normal equation is a system of linear equations, it could, in principle, be solved using elimination known under the title of Gaussian, or by the use of factorisation known under the title of Cholesky.

Secondly, the calculation module (132) is designed to detect and eliminate the erroneous data (stage 1004, FIG. 1) from all of the data necessary for calculation of the unknown parameters ($L_i$, $\theta_i$).

To detect the erroneous data that are inducing errors into the calibration, the calculation module (132) uses the following model (Fe1), and using the matrix system (SM) described above:

$$A \cdot \hat{x} + \epsilon = c \tag{Fe1}$$

in which $\hat{x}$ represents the true undamaged but unknown values of parameters ho, $a_i$ and $b_i$, i=1, ..., n, and $\epsilon$ represents the error addition vector.

Now the error addition vector ($\epsilon$) is unknown, and cannot be calculated. In order to solve this problem, an estimate must be made by the calculation module (132) of the calibration system (13). More precisely, the calculation module (132) makes an estimate of the ratio of $\epsilon_k$, $k \in \{1, ..., M\}$ and the variance of the other errors $\epsilon_j$, $j \neq k$.

The external residual error technique known under the title of "Student" can be used to reach such an estimate so that, for the $k^{th}$ positions supplying the measured data, the equation (Fe2) is obtained determined by $$t_k = \frac{e_k}{\sigma_k \sqrt{1 - v_{kk}}}$$

in which $e_k$, $V_{kk}$ and $\sigma_k$ are defined as follows:

$$e_k = c_k - \sum_{j=1}^{2n+1} A_{k,j} \cdot x_j,$$

meaning that $e_k$ is the residual error of the $k^{th}$ equation in the matrix system (SM) for solution x of the matrix system (SM); $V_{kk}$ is the $k^{th}$ diagonal element of the matrix $V=(v_{ij})=A(A^T A)^{-1} A^T$; and $$\sigma_{(k)}^2 = \frac{rss - \frac{e_k^2}{1 - v_{kk}}}{\hat{M}}$$

in which $\hat{M}$ is at least the number of equations minus the number of unknowns of the matrix system (SM), i.e. $\hat{M} = M - (2n+1) - 1$.

Basing our approach on the Student external residual error technique ($t_k$), only one erroneous data item can be detected each time. In order to find all the erroneous data, an iterative procedure has to be used. This procedure includes an initialisation stage, which consists of solving the matrix system (SM) $A \cdot x = c$, in which A and c include all the positions taken up by the articulated components (10, 11, 12) of the excavating machine (1) so as to supply the entry data.

This is followed by a stage of iteration. This iteration stage consists of calculating the maximum ($t_m$) of the absolute values of all the Student external residual errors resulting from the matrix system (SM) solved at the initialisation stage (also called stage K–1), with $$t_m = \max_k |t_k|.$$

If the maximum ($t_m$) of the absolute values is smaller than a given threshold ($\tau$), the iteration stage is stopped. The entry data include erroneous data that are detectable by any means, and the second member (x) of the equality of the matrix system (SM) contains the solution of the matrix system (SM).

Otherwise, the iteration stage consists of finding the position supplying erroneous data that corresponds to the index k supplying the maximum value ($t_m$) and then again solving the matrix system (SM) $A \cdot x = c$, but including only the remaining data to construct A and c.

Then the initialisation stage and the iteration stage of the iterative procedure for the index k+1, with this stage being entitled the progression stage are repeated.

Although this procedure stops after a finite number of iterations, it is practical to limit it to a few iterations only, such as, and in a manner that is not limiting, 5 to 10 iterations for example. If there is a larger number of erroneous data than there are iterations, then the mean variation resulting from the errors ($\epsilon_k$) will be very large and reliable detection of the errors will not be possible in any case.

For the threshold ($\tau$) that was used by the iterative procedure, a usable value, for example and in a manner that is not limiting, is $\tau = 3$. The external residual errors technique known under the title of Student ($t_k$), within this limit, represents more than 99% of possible cases if M>20. The higher values of $t_k$ can be seen as exceptional cases to be excluded from the calibration method according to the invention.

It should be noted that the observed residual errors $(A \cdot x)_k - c_k$ can provide a possible indication for detection of the erroneous data. They are not independent however, and do not have any common variance. Determination of suitable thresholds with the aid of an operator or by an algorithm, basing our approach on the mean or an analysis by cluster theory or similar techniques, are not very reliable.

The heterogeneous variances in the observed residual errors are easily corrected by the standardisation of each residual error. The Student external residual error technique is one of the methods that can be used to correct the variances. The standardised residual error technique, sometimes called the Student internal residual error technique, is also used. For the non-erroneous data, these transformed residual errors behave either in a similar manner to a Student random variable or exactly like a Student distribution. This takes account of the test for detection of the erroneous data with a common predetermined threshold based on the Student distribution, or a threshold that is adjusted in a supplementary manner using the Bonferroni method.

In a manner that is not limiting, other residual error techniques that are usable for detection of the erroneous data are, for example and in a manner that is not limiting, recursive residual error techniques. For the simultaneous detection of multiple erroneous data, versions similar to the Student external or internal residual error technique also exist.

Finally, the calculation module (132) is designed to analyse the measurement errors.

If the measured data contain errors, the solution of the matrix system (SM) will be only one approximation of the values of the lengths ($L_i$) and of the actual angular positions ($\theta_i$). The precision achieved is not influenced by the variance of the entry data, but only by the number of measurements and, in particular, by all of the angles obtained from the different measurements performed by the detector devices (10, 11, 12). To estimate the quality of the calibration method, a test can be carried out on a quantity, while taking account of the entry data and the result of the calibration method.

By giving a particular set of measured angles and measured distance of the reference laser planes or lines (preferred embodiment) or of the distances and vertical movements between each reference plane formed by a rod (first implementation variant), the corresponding solution $y=(l_1, \ldots, l_n, \theta_1, \ldots, \theta_n)^T$ of the matrix system (SM) can be written in a functional form (Fe3) such as $y=y(z)$ in which z is the vector containing all the determined parameters.

By replacing, in a formal manner, the values of the parameters measured in z by the sum of the values of the actual (but unknown) parameters and the measurement error, that is $z=\hat{z}+\delta$, and also by using an first order approximation of the above formula $z=\hat{z}+\delta$, the equation (Fe3) becomes the following equation (Fe4) $y=y(\hat{z}+\delta)=y(\hat{z})+Dy(\hat{z})\cdot\delta$ The difference $\Delta=y-y(\hat{z})$ between the calculated solution (y) and the values of the actual parameters can be approximated by the product of the derivative $Dy(\hat{z})$ and the vector of the measurement errors ($\delta$)

If it is assumed that a normal distribution of the errors ($\delta$) in the entry data with a given variance ($\sigma_k$) for the measurement error $\delta_k$, an approximation of the variance ($\rho_i$) of the error ($\Delta_i$) of the $i^{th}$ parameter in the solution of the matrix system (SM) is then given by:

$$\rho_i = \sqrt{\sum_{k=1}^{m}((Dy(\hat{z}))_{i,k} \cdot \sigma_k)^2}$$

in which m is the number of individual input values, $m=n(N1+N2)+1$ for the first method associated with the preferred embodiment, and $m=n \cdot 3 \cdot N+2(N-1)$ for the second method associated with the first implementation variant.

Since the value $\hat{z}$ is not known, it cannot be calculated directly. But, it is valid to assume that the derivative $Dy(z)$ for the measured values (z) is close enough to the derivative $Dy(\hat{z})$ to mean that it can be used in place of the derivative $Dy(z)$ in order to obtain an appropriate estimate of the possible variation in the solution of the matrix system (SM) from the values of the actual parameters. This derivative $Dy(z)$ can be calculated easily using the applied implicit function theorem due to the fact that the solution (y) of the matrix system (SM) is calculated from the solution x of the minimisation problem by the least squares technique. The values of the variance $\rho_i$, $i=1, \ldots, 2n$ calculated for the specific data item of a calibration method then supply the possible set of the errors in the calibrated parameters.

It should be noted that if the excavating machine (1) is always calibrated, but that one or more components (10, 11, 12) of the excavating machine (1) are modified by the operator, such as a different bucket (12) fitted, or a defective detector device (20, 21, 22) replaced, only the parameters of the changed component(s) or device(s) need to be calibrated again. The recalibration method is the same as for the full calibration method for the excavating machine (1), described previously, but the unchanged parameters, represented on the screen (131a) of the calibration system (13), of the other detector devices (20, 21, 22) or articulated components (10, 11, 12) of the excavating machine (1), can be specified by the operator as known constants, in place of unknown parameters in the matrix system (SM). Since the lengths ($L_i$) and the angular offsets ($\theta_i$) are not used directly in the matrix system (SM), but are the new associated parameters ($a_i$ and $b_i$), in certain cases, additional stages must be executed in order to solve the matrix system (SM) and to calculate the new lengths ($L_i$) and the new angular offsets ($\theta_i$) associated with the articulated component or components of the excavating machine (1) and/or with the detector device or devices moved or changed.

Now examples of a mathematical solution are described in the case in which one or more components (10, 11, 12) of the machine (1) are modified by the operator. In a manner that is not limiting, other mathematical solution methods in the case in which one or more components (10, 11, 12) of the machine (1) are modified by the operator can also be envisaged.

If for a particular articulated component of the excavating machine (1), that is for a particular i belonging to the set $\{1, \ldots, N\}$, the lengths ($L_i$) and the angular offsets ($\theta_i$) are supplied as constant values, then no particular processing is necessary. The following constant values $$a_i \cdot \sin(\beta_i^{(j,k)}) = l_i \cdot \cos(\theta_i) \cdot \sin(\beta_i^{(j,k)})$$

$$b_i \cdot \cos(\beta_i^{(j,k)}) = -l_i \cdot \sin(\theta_i) \cdot \cos(\beta_i^{(j,k)})$$

and in the case of the second mathematical method associated with the first implementation variant, also the following constant values $$a_i \cdot \cos(\beta_i^{(j,k)}) = l_i \cdot \cos(\theta_i) \cdot \cos(\beta_i^{(j,k)})$$

$$-b_i \cdot \sin(\beta_i^{(j,k)}) = l_i \cdot \sin(\theta_i) \cdot \sin(\beta_i^{(j,k)})$$

for all (j, k), must be calculated and subtracted from both sides of the equations of the matrix system (SM). Solution of the matrix system (SM), elimination of erroneous input data, and the estimation of the measurement errors, will be effected in a manner similar to the full calibration method for the excavating machine (1).

If only the angular offset ($\theta_i$) is unchanged and the length ($L_i$) is unknown, for a particular articulated component of the excavating machine (1), i.e. for a particular i, the situation changes slightly. In this case, the following mathematical term (Fr1) $l_i \cos(\theta_i) \cdot \sin(\beta_i) - l_i \sin(\theta_i) \cdot \cos(\beta_i)$ in the formula for calculating the vertical depth (h) of the bucket (12) can be changed according to $l_i \cdot (\cos(\theta_i) \cdot \sin(\beta_i) - \sin(\theta_i) \cdot \cos(\beta_i))$, in which the mathematical term in brackets is a constant. The same operation is possible for the formula for calculating the horizontal depth (H) of the bucket (12), so that the unknown length ($L_i$) can be used directly by the matrix system (SM).

For the case in which only the length ($L_i$) is unchanged, $\hat{a}_i = \cos(\theta_i)$ and $\hat{b}_i = -\sin(\theta_i)$ are set to rewrite the mathematical term (Fr1) such that $\hat{a}_i \cdot l_i \sin(\beta_i) + \hat{b}_i \cdot l_i \cos(\beta_i)$ and the corresponding mathematical term for calculating the horizontal depth (H) of the bucket (12) such that $\hat{a}_i \cdot l_i \cos(\beta_i) - \hat{b}_i \cdot l_i \sin(\beta_i)$.

Having solved the resulting system with the unknown parameters $\hat{a}_i$ and $\hat{b}_i$ in place of $a_i$ and $b_i$, the angular offset ($\theta_i$) can be calculated either through $\theta_i = \arccos(\hat{a}_i)$ or $\theta_i = -\arcsin(\hat{b}_i)$. Unfortunately, because of the errors in the entry data, in particular the error in the length ($L_i$), the two results will be always the same. The best compromise, introducing the smallest additional error, is to calculate the angular offset according to the following formula $$\theta_i = -\arctan\left(\frac{\hat{b}_i}{\hat{a}_i}\right).$$

It should be noted that the parameters that are unchanged and entered as constants in the recalibration procedure introduce additional errors. The parameters determined during a full calibration of the excavating machine (1) can be very inaccurate. These errors will very significantly influence the accuracy of the recalibrated component(s) and/or detector device or devices. The best method would be to do a full calibration of the excavating machine (1) even if only a few parameters have changed. Advantageously, this can be used to improve the accuracy of the already known parameters.

Once determined, and where appropriate after elimination of erroneous input data (1004), the parameters ($L_i$, $\theta_i$) are validated where appropriate by the operator by means of a test. This test consists of positioning the working tool (12) on a reference plane, and then to verifying that the horizontal and/or vertical depth of the working tool (12) have not changed.

The parameters ($L_i$, $\theta_i$) are then stored (1005) in the memory (133) of the calibration system (13) of the machine (1) so that they can be used for controlling (1006) the luminous indicator display used to guide the operator, in the execution of his excavation work, to a given horizontal (H) and/or vertical (h) depth of the bucket (12).

Now the use of the parameters ($L_i$, $\theta_i$) determined by the calibration method described previously is described.

The use of the calibration parameters ($L_i$, $\theta_i$) consists, by means of a control module of the display (134) provided in a guidance system of the machine (1), of controlling the luminous indicator display provided on the user interface of the guidance system of the machine (1). As an example, these luminous indicators are arrows oriented upwards or downwards and arrows oriented to the left or right. Once the calibration has been determined, the operator chooses a work or excavation profile. Then the operator, by means of these control levers (131c), moves the end of the bucket (12) in accordance with the information supplied by the luminous indicators. In fact, the luminous indicators can be used so as to guide the operator when moving the working tool (12). Control over the luminous indicators is determined by the information supplied by the calculation module (132) of the calibration system (13) which, by means of the calibration parameters ($L_i$, $\theta_i$) and a reference plane or line for example, calculates a reference horizontal laser line, the vertical and/or horizontal depth of the bucket (12) at each of these movements, and then compares the vertical and/or horizontal depth measured in relation to the data contained in the chosen profile by the operator.

In the case in which the reference planes or lines used for controlling the working tool (12) are created by laser devices, a laser receiver device (14) can be placed in an imprecise manner on one of the articulated arms (10, 11) of the machine (1) so as to detect the height of a reference laser plane or line. In the example shown in FIG. 3, this device (14) is positioned on the support arm (10). This laser receiver device (14) includes a wireless communication module that is used to send a transmit signal or signals (Sg'), and thus to transmit laser beam detection data to the guidance system of the machine (1). The laser receiver device (14) can be independent, in the same manner as the angular position detector devices (20, 21, 22) and includes for example:

a linear laser reception cell including aligned photodiodes (linear laser receiver),
a power feed by solar panel(s) charging a battery,
a radio transmitter provided in the wireless communication module, to send data by radio, and
a magnetised attachment face.

The guidance system of the machine (1) receives the data supplied by the laser receiver device (14). These data represent height detection in the reference laser plane. The linearity of the laser receiver allows capturing of the beam over a larger height, and as a consequence does not require stopping the movement of the arm (10 or 11) for the detection process. An intermediate photodiode can be considered as a reference sensor and the photodiodes higher or lower in relation to this reference are each associated with a height-adjustment increment or decrement respectively. Alternatively, a receiver (low cost and of reduced accuracy) can simply have a non-linear cell with, where appropriate, a lens system to increase the detection zone. Either of these options can be chosen as the need dictates.

In this last case, it is necessary to effect a stage, in addition to the calibration method, that is used to determine the unknown axial and longitudinal position parameters of the laser receiver device (14) on its articulated element (10 or 11). This stage is similar to the calibration method described previously. This stage consists, for different angular configurations taken up by the articulated elements (10, 11) and the working tool (12), of performing cross-referencing between the reference plane or line and the end of the working tool (12), and then cross-referencing this same reference plane or line with the laser receiver device (14), so as to provide the calculation module (132) of the calibration system (13) of the machine (1) with a series of equations linking the position of the laser detector device (14) to the geometry of the system formed by the articulated elements (10, 11) and the working tool (12). The calculation module (132) of the calibration system (13) is designed, using an appropriate program for the solution of mathematical equations, to then determine the unknown axial and longitudinal position parameters of the laser receiver device (14) on its articulated element.

Referring to FIG. 9, the automatic calibration system (13) of an earthworking machine (1) is going to be described.

This automatic calibration system (13) is equipped with a unit, on the front panel of which is provided the user interface (131) fitted with the display screen (131a) together with the keyboard (131c).

Inside this unit, the automatic calibration system (13) includes the wireless communication receiver (130) intended to receive the signals (Sg) representing the angular position data ($\beta_i$) transmitted by the different detector devices (20, 21, 22).

Inside the unit, the automatic calibration system (13) includes the memory (133) that is intended to store the data measured by the detector devices (20, 21, 22), the known input data entered by the operator on the keyboard (131b) of the user interface (131), and the calibration parameters ($L_i$, $\theta_i$) once they have been determined.

Also inside the unit, the automatic calibration system (13) includes the calculation module (132) which, by means of the appropriate program for the solution of mathematical equations, is intended to calculate and determine the unknown parameters ($L_i$ and $\theta_i$), by means of the known input data stored in the memory (133) and the measured angular position data ($\beta_i$). In addition, the calculation module (132) is designed to supply the information calculated by means of the determined calibration parameters ($L_i$ and $\theta_i$) and of the work profile or profiles chosen by the operator, to a control module (134) for the display of the luminous indicators of the guidance system, so as to guide the operator when moving the bucket (12).

The guidance system of the machine (1) includes the control module (134) of the luminous indicator display used to guide the operator when moving the bucket (12), and a user interface fitted with luminous indicators used to guide the operator when moving the working tool (12) after the calibration.

The screen (131a) that is common to the calibration system (13) and the guidance system of the machine (1) allows to display the different profiles that can be chosen by the operator to control working tool (12), the chosen profile, and the information necessary for calibrating the working tool (12). The keyboard (131b) that is common to the calibration system (13) and to the guidance system of the machine (1) enables the operator to choose the excavation profile, to enter the information relating to the known input data and validation of the calibration parameters ($L_i$ or $\theta_i$), and the control setpoints of the working tool (12).

Such an automatic calibration system (13) is placed in the cab of the earthworking machine (1).

Figure 10:
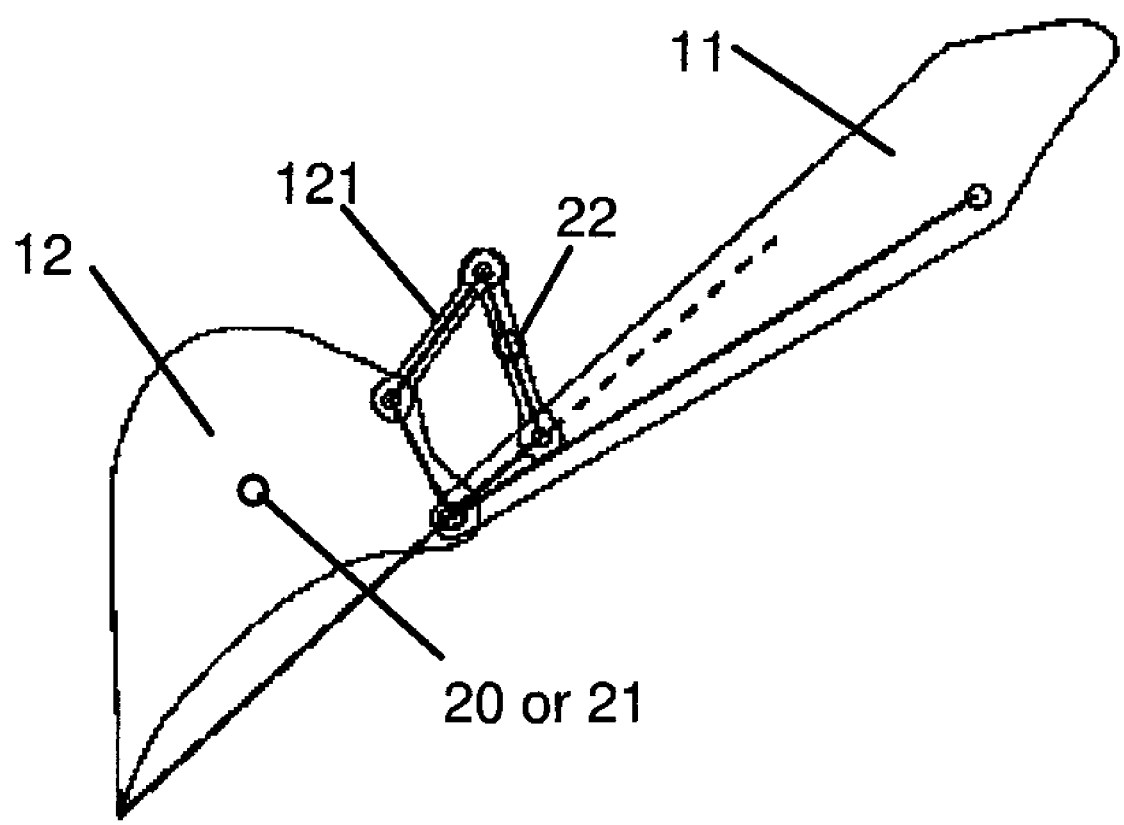
FIG. 10 is an illustration of the stage prior to the calibration method that is used to determine the angular offset of a detector device on one of the elements forming the articulation compass between the bucket and the bucket arm.

Referring to FIG. 10, it should be noted that the detector device (22) placed on the bucket (12) can, in certain cases, be placed on one of the elements forming the articulation compass (121) between the bucket (12) and the bucket arm (11). In fact, by placing the detector device (22) directly on the bucket (12), the detector device (22) can, for example, be damaged during the excavation. In the case in which the detector device (22) is placed on one of the elements forming the articulation compass (121) between the bucket (12) and the bucket arm (11), it is necessary to effect a stage prior to the calibration method described previously, that consists of moving one of the detector devices (20, 21) on the bucket (12) and then rotating the bucket (12) about its articulation axis over different reference points. For each movement of the bucket (12), the detector device (22) placed on one of the elements of the compass (121), and the moved detector device (20 or 21), supply the measured angular position data to the calibration system (13). By means of an appropriate program, the calculation module (132) of the calibration system (13) performs a comparison between the angular position data supplied by these detector devices, so as to obtain a mathematical relation that can be used to determine the angular offset of the detector device placed on one of the elements forming the articulation compass (121).

It should be noted that for further details relating to the detector devices (20, 21, 22) and to the excavating machine (1) fitted with the detector devices (20, 21, 22), the reader can refer to the document entitled "Independent position sensor and system for determining the position of a tool on a works machine using position sensors" ("Capteur autonome de position et système de determination de position d'un outil d'engin de travaux via des capteurs de postion"), which has been accorded the registration number FR 07 02 888.

One of the advantages of the invention is that the method for automatically calibrating a works machine allows the driver of a public works machine to prepare his machine for work without requiring the intervention of a specialist technician.

It must be obvious to those skilled in the art that this present invention allows embodiments in many other specific forms without moving outside the area of application of the invention as claimed. As a consequence, the present embodiments must be considered to have been presented by way of illustration only, and can be modifies within the area specified by the scope of the attached claims, and the invention must not be limited to the details given above.

The invention claimed is:

1. A method of automatically calibrating an earthworking machine equipped with an articulated arm in a plane, and unable to rotate about its axis of symmetry, wherein a working tool is positioned at the end of the arm, the calibration method comprising, after a series of movements of the end of the working tool between reference points that are not on the earthworking machine and are located in accordance with a given geometrical configuration, collecting angular position data relating to different articulated components of the earthworking machine, said angular position data being (a) derived by removable and interchangeable detector devices positioned in an imprecise manner on each articulated component of the machine, and (b) sent by a communication link to a system for calibrating the earthworking machine; and operating a calculation module of the calibration system of the machine to determine, by use of known input data representing the reference points, unknown parameters representing the positioning inaccuracies of the detectors.

2. A calibration method according to claim 1, wherein the unknown parameters correspond to the lengths of the articulated components of the machine and to the angular offsets of each detector device in relation to the articulated component on which the detector device is positioned.

3. A calibration method according to claim 1, wherein the calculation module determines the unknown parameters by solving a system of mathematical equations.

4. A calibration method according to claim 3, wherein the mathematical equations are obtained from mathematical relations that determine the data representing the vertical position and the horizontal position of the working tool as a function of the unknown parameters.

5. A calibration method according to claim 1, wherein the known input data for a given geometrical configuration corresponds to the distances between the reference planes and/or lines on which are positioned the reference points of the geometrical configuration, and/or to the distances between the reference points of the geometrical configuration, and/or, where appropriate, to the coordinates of the reference points of the geometrical configuration, wherein these known input data are entered by an operator and then stored in a memory of the calibration system to correspond to a position of the end of the tool, the stored data being for use in calculating the unknown parameters by associating them with the measured angular position data corresponding to each position taken up by the end of the working tool.

6. A calibration method according to claim 5, wherein the geometrical configurations correspond to geometrical combinations of reference planes or lines which are vertical or horizontal or oriented at a known angle, on which can be located at least one reference point, with the reference planes or lines of the geometrical configurations being obtained by a laser device or by the movement of a rod on which are positioned markers corresponding to the reference points, or by any type of device that can be used to form a reference plane or line.

7. A calibration method according to claim 1, wherein a system of mathematical equations is solved by a computer of the calculation module of the calibration system, wherein the computer solves a matrix system containing, for the given geometrical configuration and for each position of the geometrical configuration taken up by the end of the working tool, the angular position data of each articulated component of the machine and the known input data relating to this geometrical configuration.

8. A calibration method according to claim 7, wherein the number of equations is determined by each position taken by the end of the working tool for the given configuration, and the matrix system being formed so the number of equations is equal to or greater than the number of unknown parameters to be determined.

9. A calibration method according to claim 1, wherein the calibration method includes a stage that determines and eliminates the erroneous angular position data that are created by a program that is executed by the calculation module of the calibration system, by using one or more appropriate mathematical methods, with the known input data associated with erroneous angular position data that are eliminated from the data set necessary for calculating the unknown parameters.

10. A calibration method according to claim 1, further including a stage that analyzes the measurement errors, where appropriate, to estimate the quality of the calibration method, the analysis by the stage including performing a test on a quantity while taking account of the measured input and angular position data and the result of the calibration.

11. A calibration method according to claim 1, wherein in the event of a change by the operator of at least one articulated component of the machine, or a change of position by the operator of at least one detector device, the calibration method is not necessarily re-executed in full and the unchanged parameters represented on a display system of the calibration system are specified by the operator as constants in place of the unknown parameters.

12. A calibration method according claim 1, wherein, once determined and, where appropriate, after elimination of the erroneous data, the parameters are, where appropriate, validated by an operator of the machine by using a test, and storing the validated parameters in a memory of the calibration system of the machine so that they can be used for controlling a luminous indicator display that guides the operator in moving the working tool after the calibration.

13. A calibration method according to claim 12, wherein the test includes positioning the working tool on a reference plane or line, and then verifying that the horizontal and/or vertical depth of the working tool has not changed.

14. A calibration method according to claim 1, wherein, if the detector device is on one of the elements forming an articulation compass between the working tool and the arm of the working tool, an operation prior to the calibration method is performed, where appropriate, said prior operation including moving one of the detector devices on the working tool and then rotating the working tool about its articulation axis over different reference points, with the detector device being on one of the elements of the compass and the moved detector device supplying, for each movement of the working tool, the calibration system with the measured angular position data, and then using the calculation module of the calibration system to compare the angular position data supplied by these detector devices, to obtain a mathematical relation that can be used to determine the angular offset of the detector device on one of the elements forming the articulation compass.

15. An automatic calibration system for an earthworking machine including an articulated arm at the end of which is positioned a working tool, with an independent detector device including angular position sensor(s) positioned in an imprecise, removable and interchangeable manner on each articulated component, the calibration system being used to perform an automatic calibration method according to claim 1, wherein the calibration system includes a unit having a front panel including a user interface including a display screen, a keyboard and a button for triggering the measurement and for sending and storing angular position data supplied by the detector devices, where the unit contains inside:
- a communication receiver for receiving the signals representing the angular position data transmitted by the different detector devices;
- a memory for storing: (a) the data measured by the detector devices, (b) the known input data entered by an operator of the machine on the keyboard of the user interface, and (c) the calibration parameters once they have been determined;
- a calculation module including an appropriate program for causing a computer of the calculation module to solve the mathematical equations, as well as to calculate and determine the unknown parameters, in response to (a) the known input data stored in the memory and (b) the measured and received angular position data.

16. A calibration system according to claim 15, wherein, after the calibration, the calculation module is arranged to supply information calculated in response to the determined calibration parameters and of work profile(s) chosen by the operator, to a control module of the luminous indicator display of a guidance system of the machine for guiding the operator when moving a bucket of the machine, or any other display for providing assistance to the operator.

17. A calibration system according to claim 15, wherein the program for the solution of mathematical equations executed by the calculation module for the calibration is arranged to cause the computer to solve a system of mathematical equations.

18. A calibration system according to claim 15, wherein the calculation module is arranged to determine and eliminate erroneous data resulting from measurement errors from all the entry data supplied and necessary for the mathematical solution.

19. A calibration system according to claim 15, wherein the screen, which is common to the calibration system and the guidance system of the machine, is arranged to display different profiles that can be chosen by the operator to control the working tool after the calibration; the chosen profile, and the information necessary for calibrating the working tool and the keyboard, common to the calibration system and to the guidance system of the machine, being arranged to enable the operator to (a) choose a work profile, (b) enter information relating to the known input data, (c) validate the calibration parameters, and (d) control setpoints of the working tool.

20. A calibration system according to claim 15, wherein the receiver is a wireless receiver arranged to be responsive to radio waves at a given frequency, or any other short or medium distance wireless communication device.

21. A calibration system according to claim 15, wherein the calibration system is arranged to be powered by a power source in the earthworking machine.

22. A calibration system according to claim 15, wherein, in the case in which the detector device is on one of the elements forming an articulation compass between the working tool and an arm of the working tool, the computer of the calculation module including a program that is adapted to be used prior to the calibration being performed to determine a mathematical relation for determining the angular offset of the detector device on one of the elements forming the articulation compass from a comparison of angular position data supplied by a detector device on one of the elements of the compass and a moved detector device on the working tool.

23. An earthworking machine equipped with an articulated arm at the end of which is positioned a working tool, the machine comprising at least one independent detector device including wireless angular position sensor(s), the detector device being positioned in an imprecise, removable and interchangeable manner on each articulated component, control levers for manually controlling the machine, and an automatic calibration system according to claim 15, in a cab of the earthworking machine.

24. An earthworking machine according to claim 23, comprising a laser detector that can be placed at the end of the working tool for determining the moment of the end of the working tool relative to a reference point of a reference laser plane or line used for the calibration, and for automatically triggering the measurement and then transmission and storage of the angular position data supplied by the detector devices, in the case in which the reference planes or lines of the determined geometrical configurations used for the calibration are created by laser devices.

25. An earthworking machine according to claim 24, wherein the detector device includes a communication module for sending one or more trigger signals for measuring the angular position data of the detector devices.

26. An earthworking machine according to claim 24, wherein the communication module of the laser detector and the communication module of the laser receiver device are arranged to use radio waves at a given frequency, or any other short or medium distance wireless communication device.

27. An earthworking machine according to claim 23, further including a laser receiver device adapted to be placed in an imprecise manner on one of the articulated arms of the machine for detecting a height on a reference laser plane or line, in the case in which reference laser planes or lines are used to control the working tool after the calibration.

28. An earthworking machine according to claim 27, wherein the laser receiver device includes a communication module for sending a transmit signal or signals, and for transmitting laser beam detection data to a guidance system of the machine.

29. A calibration method according to claim 1, wherein the reference plane or line is created by a laser device and detected by a laser receiver device on one of the articulated elements of the machine, the laser receiver device including a stage, in addition to the calibration stage, for determining the axial and longitudinal positions.

30. A calibration method according to claim 29, wherein the stage, in addition to the calibration stage includes, for different angular configurations of the articulated elements and the working tool, cross-referencing between the reference plane or line and the end of the working tool, and then cross-referencing this same reference plane or line with the laser receiver device, to supply, to the calculation module of the calibration system of the machine, a series of equations linking the position of the laser detector device to the geometry of the system formed by the articulated elements and the working tool, the calculation module of the calibration system determining, via an appropriate program for the solution of mathematical equations, the unknown axial and longitudinal position parameters of the laser receiver device on its articulated element.

31. A calibration method according to claim 1, wherein the communication link is wireless.

* * * * *